(12) United States Patent
Suwa et al.

(10) Patent No.: US 11,826,852 B2
(45) Date of Patent: Nov. 28, 2023

(54) LASER PROCESSING APPARATUS, LASER PROCESSING SYSTEM, AND LASER PROCESSING METHOD

(71) Applicant: Gigaphoton Inc., Tochigi (JP)

(72) Inventors: Akira Suwa, Oyama (JP); Osamu Wakabayashi, Oyama (JP); Masashi Shimbori, Oyama (JP); Masakazu Kobayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 472 days.

(21) Appl. No.: 17/088,704

(22) Filed: Nov. 4, 2020

(65) Prior Publication Data
US 2021/0046584 A1    Feb. 18, 2021

Related U.S. Application Data

(63) Continuation of application No. PCT/JP2018/024435, filed on Jun. 27, 2018.

(51) Int. Cl.
*B23K 26/14* (2014.01)
*B23K 26/12* (2014.01)

(52) U.S. Cl.
CPC ........ *B23K 26/1462* (2015.10); *B23K 26/126* (2013.01)

(58) Field of Classification Search
None
See application file for complete search history.

(56) References Cited

U.S. PATENT DOCUMENTS

| 5,609,781 A | 3/1997 | Kaga et al. |
| 2002/0130116 A1* | 9/2002 | Lawson ............... B23K 26/147 |
| | | 219/121.84 |

(Continued)

FOREIGN PATENT DOCUMENTS

| CN | 101332535 A | 12/2008 |
| CN | 102378891 A | 3/2012 |

(Continued)

OTHER PUBLICATIONS

An Office Action mailed by China National Intellectual Property Administration dated Jun. 1, 2022, which corresponds to Chinese Patent Application No. 201880093116.0 and is related to U.S. Appl. No. 17/088,704; with English language translation.

(Continued)

*Primary Examiner* — Geoffrey S Evans
(74) *Attorney, Agent, or Firm* — Studebaker & Brackett PC

(57) ABSTRACT

A laser processing apparatus according to the present disclosure includes a placement base on which a processing receiving object is placed, an optical system that guides laser light to the processing receiving object, a gas supply port via which a gas is supplied to a laser light irradiated region of the processing receiving object, a gas recovery port via which the supplied gas is recovered, a mover that moves the irradiated region, and a controller that controls, in accordance with the moving direction of the irradiated region, the direction of the flow of the gas flowing from the gas supply port to the gas recovery port, and the controller changes the direction of the gas flow in response to a change in the moving direction of the irradiated region in such a way that the gas flows in the direction opposite the moving direction of the irradiated region.

19 Claims, 25 Drawing Sheets

(56) References Cited

U.S. PATENT DOCUMENTS

| | | | |
|---|---|---|---|
| 2005/0014315 A1* | 1/2005 | Yamamoto | H01L 21/02532 |
| | | | 257/E21.415 |
| 2007/0178674 A1* | 8/2007 | Imai | B23K 26/067 |
| | | | 219/121.65 |
| 2008/0041832 A1 | 2/2008 | Sykes et al. | |
| 2008/0145567 A1 | 6/2008 | Ohmae et al. | |
| 2008/0191121 A1* | 8/2008 | Yoo | B23K 26/40 |
| | | | 250/201.4 |
| 2008/0227274 A1* | 9/2008 | Hongo | H01L 27/1285 |
| | | | 257/E21.347 |
| 2009/0068598 A1 | 3/2009 | Murase et al. | |
| 2012/0028202 A1 | 2/2012 | Katsumata | |
| 2014/0305917 A1 | 10/2014 | Gadd | |
| 2015/0187616 A1* | 7/2015 | Huang | B23K 26/0892 |
| | | | 438/795 |
| 2016/0114531 A1* | 4/2016 | Chuang | B29C 64/153 |
| | | | 264/497 |
| 2017/0106471 A1 | 4/2017 | Yoshii et al. | |
| 2017/0136696 A1* | 5/2017 | Jakimov | B29C 64/371 |
| 2018/0178285 A1* | 6/2018 | Martin | B29C 64/268 |
| 2018/0315627 A1* | 11/2018 | Ito | H01L 21/67115 |
| 2018/0345416 A1* | 12/2018 | Zhu | B23K 26/147 |

FOREIGN PATENT DOCUMENTS

| | | |
|---|---|---|
| CN | 104096968 A | 10/2014 |
| CN | 107584209 A | 1/2018 |
| CN | 108031991 A | 5/2018 |
| JP | H06-190582 A | 7/1994 |
| JP | H09-168885 A | 6/1997 |
| JP | 2003-031953 A | 1/2003 |
| JP | 2008-264858 A | 11/2008 |
| JP | 2015-073081 A | 4/2015 |
| JP | 2017-080754 A | 5/2017 |

OTHER PUBLICATIONS

An Office Action; "Notification of Reasons for Refusal", mailed by the Japanese Patent Office dated Jan. 5, 2022, which corresponds to Japanese Patent Application No. 2020-526791 and is related to US. Appl. No. 17/088,704; with English language translation.

International Search Report issued in PCT/JP2018/024435; dated Oct. 2, 2018.

International Preliminary Report on Patentability and Written Opinion issued in PCT/JP2018/024435; dated Dec. 29, 2020.

* cited by examiner

FIG. 40

| ITEM | CASE 1 | CASE 2 | CASE 3 |
|---|---|---|---|
| TARGET PULSE ENERGY Et (mJ) FROM LASER APPARATUS | 50 | 50 | 100 |
| REPETITIVE FREQUENCY fi (Hz) AT PROCESSING SURFACE | 4000 | 4000 | 4000 |
| LENGTH By OF LINEAR BEAM ALONG MAJOR AXIS (cm) | 7 | 7 | 7 |
| LENGTH Bx OF LINEAR BEAM ALONG MINOR AXIS (cm) | 0.01 | 0.005 | 0.01 |
| NUMBER OF PROCESSING PULSES Ni | 40 | 20 | 20 |
| MAGNIFICATION FACTOR M OF PROJECTION OPTICAL SYSTEM | 0.500 | 0.500 | 0.500 |
| FLUENCE Fi (mJ/cm$^2$) | 300 | 600 | 600 |
| TRANSMITTANCE Tp PROVIDED BY LASER PROCESSING APPARATUS | 0.5 | 0.5 | 0.5 |
| TRANSMITTANCE Ti PROVIDED BY ATTENUATOR | 0.84 | 0.84 | 0.84 |
| BEAM SCAN SPEED Vxi (cm/s) AT SURFACE OF PROCESSING RECEIVING OBJECT | 1 | 1 | 2 |
| MOVING SPEED Vxmi (cm/s) OF UNIAXIAL STAGE | 2 | 2 | 4 |
| AVERAGE FLOW SPEED Vpgi (cm/s) OF PURGE GAS ($\alpha$=1) | 40 | 20 | 40 |
| FLOW RATE Qpgi (L/s) OF PURGE GAS (CROSS-SECTIONAL AREA $\beta$=7cm×1cm) | 280 | 140 | 280 |

LASER PROCESSING APPARATUS, LASER PROCESSING SYSTEM, AND LASER PROCESSING METHOD

CROSS-REFERENCE TO RELATED APPLICATIONS

The present application is a continuation application of International Application No. PCT/JP2018/024435, filed on Jun. 27, 2018, the entire contents of which are hereby incorporated by reference.

BACKGROUND

1. Technical Field

The present disclosure relates to a laser processing apparatus, a laser processing system, and a laser processing method.

2. Related Art

A semiconductor exposure apparatus is required to improve the resolution thereof as a semiconductor integrated circuit is increasingly miniaturized and highly integrated. The semiconductor exposure apparatus is hereinafter referred simply to as an "exposure apparatus." Reduction in the wavelength of the light outputted from a light source for exposure is therefore underway. A gas laser apparatus is used as the light source for exposure in place of a mercury lamp in related art. At present, a KrF excimer laser apparatus, which outputs ultraviolet light having a wavelength of 248 nm, and an ArF excimer laser apparatus, which outputs ultraviolet light having a wavelength of 193 nm, are used as the gas laser apparatus for exposure.

As a current exposure technology, liquid-immersion exposure, in which the gap between the projection lens of the exposure apparatus and a wafer is filled with a liquid, has been put into use. In the liquid-immersion exposure, since the refractive index of the gap between the projection lens and the wafer changes, the apparent wavelength of the light from the light source for exposure shortens. In the liquid-immersion exposure with an ArF excimer laser apparatus as the light source for exposure, the wafer is irradiated with ultraviolet light having an in-water wavelength of 134 nm. The technology described above is called ArF liquid-immersion exposure. The ArF liquid-immersion exposure is also called ArF liquid-immersion lithography.

Since KrF and ArF excimer laser apparatuses each have a wide spectral linewidth ranging from about 350 to 400 pm in spontaneous oscillation, the chromatic aberrations occur in association with the laser light (ultraviolet light) projected with the size thereof reduced onto the wafer via the projection lens of the exposure apparatus, resulting in a decrease in the resolution. To avoid the decrease in the resolution, the spectral linewidth of the laser light outputted from the gas laser apparatus needs to be narrow enough to make the chromatic aberrations negligible. The spectral linewidth is also called a spectral width. To this end, a line narrowing module including a line narrowing element is provided in the laser resonator of the gas laser apparatus, and the line narrowing module narrows the spectral width. The line narrowing element may, for example, be an etalon or a grating. A laser apparatus having a narrowed spectral width described above is called a narrowed-line laser apparatus.

Further, the excimer laser light, which has a pulse width of about several tens of nanoseconds and has a short wavelength of 248.4 nm or 193.4 nm, is used in some cases to directly process a polymer material, a glass material, and other materials. The excimer laser light having photon energy higher than the binding energy of a polymer material can unbind the molecules that form the polymer material. Unheated processing can therefore be performed, and it is known that an excellent processed shape is achieved by the unheated processing.

Further, it is difficult to process a glass material, a ceramic material, or any other similar material with visible or infrared laser light, but it is known that excimer laser light can process such a material because the material absorbs the excimer laser light by a large amount.

CITATION LIST

Patent Literature

[PTL 1] US Patent application Publication No. 2017/0106471
[PTL 2] JP-A-9-168885
[PTL 3] US Patent application Publication No. 2008/0145567
[PTL 4] US Patent application Publication No. 2008/0041832

SUMMARY

A laser processing apparatus according to a viewpoint of the present disclosure includes a placement base on which a processing receiving object is placed, an optical system configured to guide laser light to the processing receiving object placed on the placement base, a gas supply port via which a gas is supplied to a periphery of an irradiated region of the processing receiving object that is a region irradiated with the laser light, a gas recovery port via which the gas supplied via the gas supply port is recovered, a mover configured to move the irradiated region of the processing receiving object, and a controller configured to control, in accordance with a direction in which the irradiated region is moved, a direction of a gas flow of the gas caused to flow from the gas supply port to the gas recovery port, and the controller is configured to change the direction of the gas flow in response to a change in the direction in which the mover moves the irradiated region in such a way that the gas flows in a direction opposite the direction in which the irradiated region is moved.

A laser processing system according to another viewpoint of the present disclosure includes a laser apparatus configured to output laser light, a transfer system configured to transfer the laser light outputted from the laser apparatus, a placement base on which a processing receiving object is placed, an optical system configured to shape the laser light transferred via the transfer system and guide the shaped laser light to the processing receiving object placed on the placement base, a gas supply port via which a gas is supplied to a periphery of an irradiated region of the processing receiving object that is a region irradiated with the laser light, a gas recovery port via which the gas supplied via the gas supply port is recovered, a mover configured to move the irradiated region of the processing receiving object, and a controller configured to control, in accordance with a direction in which the irradiated region is moved, a direction of a gas flow of the gas caused to flow from the gas supply port to the gas recovery port, and the controller is configured to change the direction of the gas flow in response to a change in the direction in which the mover moves the irradiated region in such a way that the gas flows in a direction opposite the direction in which the irradiated region is moved.

A laser processing method according to another viewpoint of the present disclosure includes placing a processing receiving object on a placement base, outputting laser light from a laser apparatus, guiding the laser light via an optical system to the processing receiving object placed on the placement base to irradiate the processing receiving object with the laser light, supplying a gas via a gas supply port to a periphery of an irradiated region of the processing receiving object that is a region irradiated with the laser light and recovering via a gas recovery port the gas supplied via the gas supply port, moving the irradiated region of the processing receiving object, and controlling, in accordance with the direction in which the irradiated region is moved, a direction of a gas flow of the gas caused to flow from the gas supply port to the gas recovery port, and controlling the direction of the gas flow changes the direction of the gas flow in response to a change in the direction in which the irradiated region is moved in such a way that the gas flows in a direction opposite the direction in which the irradiated region is moved.

BRIEF DESCRIPTION OF THE DRAWINGS

Embodiments of the present disclosure will be described below only by way of example with reference to the accompanying drawings.

FIG. 40 is a table showing specific examples of the laser processing conditions.

DETAILED DESCRIPTION

Figure 1:
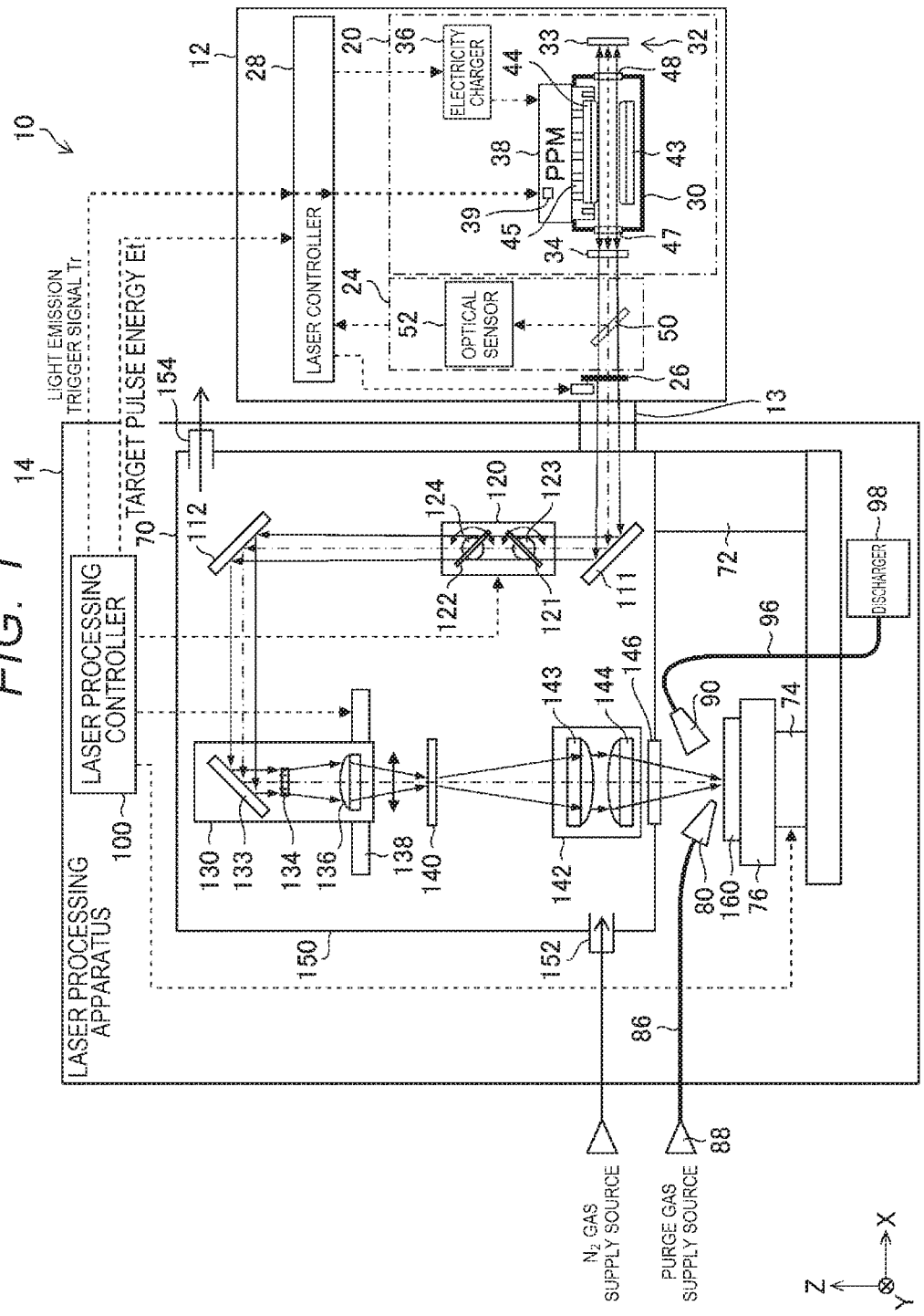
FIG. 1 schematically shows the configuration of an exemplary laser processing system.

<Contents>
1. Overall description of laser processing system
   1.1 Configuration
   1.2 Operation
   1.3 Example of control performed by laser processing system
2. Description of terms 3. Problems
4. First Embodiment
4.1 Configuration
4.2 Operation
4.3 Effects and advantages
5. Second Embodiment
5.1 Configuration
5.2 Operation
5.3 Effects and advantages
6. Variations of debris collection system that causes purge gas to flow
6.1 Variation 1
6.1.1 Configuration
6.1.2 Operation
6.1.3 Effects and advantages
6.2 Variation 2
6.2.1 Configuration
6.2.2. Operation
6.2.3 Effects and advantages
6.3 Variation 3
6.3.1 Configuration
6.3.2 Operation
6.3.3. Effects and advantages
6.4 Variation 4
6.4.1 Configuration
6.4.2 Operation
6.4.3 Effects and advantages
7. Example of fly-eye lens
7.1 Configuration
7.2 Operation
7.3 Others
8. Specific example of laser processing conditions Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Overall Description of Laser Processing System 1.1 Configuration

FIG. 1 schematically shows the configuration of an exemplary laser processing system. A laser processing system 10 includes a laser apparatus 12, an optical path tube 13, and a laser processing apparatus 14. The laser apparatus 12 is a laser apparatus configured to output ultraviolet pulsed laser light. For example, the laser apparatus 12 may be a discharge-excitation-type laser apparatus containing $F_2$, ArF, KrF, XeCl, or XeF as the laser medium. The laser apparatus 12 includes an oscillator 20, a monitor module 24, a shutter 26, and a laser controller 28.

The oscillator 20 includes a chamber 30, an optical resonator 32, an electricity charger 36, and a pulse power module (PPM) 38. The chamber 30 is configured to encapsulate an excimer laser gas. The chamber 30 includes a pair of electrodes 43 and 44, an insulating member 45, and windows 47 and 48.

The optical resonator 32 includes a rear mirror 33 and an output coupler (OC) 34. The rear mirror 33 and the output coupler 34 are formed of planar substrates coated with a high-reflectance film and a partial reflective film, respectively. The chamber 30 is disposed in the optical path of the optical resonator 32.

The monitor module 24 includes a beam splitter 50 and an optical sensor 52.

The shutter 26 is disposed in the optical path of the pulsed laser light outputted from the monitor module 24. The optical path of the pulsed laser light may be encapsulated by an enclosure and an optical path tube that are not shown and may be purged with an $N_2$ gas.

The laser processing apparatus 14 includes a radiation optical system 70, a frame 72, an XYZ stage 74, a table 76, a purge gas nozzle 80, a discharge duct 90, and a laser processing controller 100.

The radiation optical system 70 includes high-reflectance mirrors 111 and 112, an attenuator 120, a linear beam shaping optical system 130, a uniaxial stage 138, a mask 140, a projection optical system 142, a window 146, and an enclosure 150.

The high-reflectance mirror 111 is so disposed that the pulsed laser light having passed through the optical path tube 13 passes through the attenuator 120 and enters the high-reflectance mirror 112.

The attenuator 120 is disposed in the optical path between the high-reflectance mirror 111 and the high-reflectance mirror 112. The attenuator 120 includes two partially reflective mirrors 121 and 122 and rotary stages 123 and 124, which change the angles of incidence of the pulsed laser light incident on the partially reflective mirrors 121 and 122.

The high-reflectance mirror 112 is so disposed that the laser light having passed through the attenuator 120 enters the linear beam shaping optical system 130.

The linear beam shaping optical system 130 includes a high-reflectance mirror 133, a fly-eye lens 134, and a condenser lens 136. The linear beam shaping optical system 130 is so disposed as to illuminate the mask 140 with a linearly shaped beam in the form of Koehler illumination. The linearly shaped beam refers to a rectangularly shaped beam having an oblong (rectangular) beam shape. The linearly shaped beam is called a "linear beam." In the description, the direction of the minor axis of the linear beam is called an X-axis direction, and the direction of the major axis of the linear beam is called a Y-axis direction.

The high-reflectance mirror 133 of the linear beam shaping optical system 130 is so disposed that the pulsed laser light incident on the high-reflectance mirror 133 enters the fly-eye lens 134.

The fly-eye lens 134 is so disposed that the focal plane of the fly-eye lens 134 coincides with the front focal plane of the condenser lens 136. The condenser lens 136 is so disposed that the rear focal plane of the condenser lens 136 coincides with the position of the mask 140.

The linear beam shaping optical system 130 is so fixed to the uniaxial stage 138 that the linear beam is movable on the mask 140 in the X-axis direction.

The mask 140 is, for example, a mask formed of a synthetic quartz substrate which transmits ultraviolet light and on which a pattern formed of metal or dielectric multilayer film is formed. For example, to form via holes in a printed board or any other substrate, a pattern including holes each having a diameter ranging from 5 to 30 µm is formed on the mask 140.

The projection optical system 142 is so disposed as to form an image of the mask 140 on the surface of a processing receiving object 160 via the window 146. The projection optical system 142 may be a unit lens formed of a plurality of lenses 143 and 144 and may be a reduction projection optical system.

The window 146 is disposed in the laser optical path between the projection optical system 142 and the processing receiving object 160. The window 146 is disposed in a hole provided in the enclosure 150, for example, via an O ring that is not shown. The window 146 is a substrate made of $CaF_2$ crystal or synthetic quartz, which transmits excimer laser light, and may be coated with reflection suppression films on opposite sides.

The enclosure 150 has an inlet 152 and an outlet 154, via which a nitrogen gas enters and exits out of the enclosure 150. The enclosure 150 may be so sealed, for example, with O rings that outside air does not enter the enclosure 150.

The radiation optical system 70 and the XYZ stage 74 are fixed to the frame 72. The table 76 is fixed onto the XYZ stage 74. The processing receiving object 160 is fixed onto the table 76. The table 76 is an example of a placement base on which the processing receiving object 160 is placed.

The processing receiving object 160 may, for example, be an interposer substrate that functions as a relay between an LSI (large-scale integrated circuit) chip and a main printed board or a flexible printed board. The substrate is made of an electrically insulating material, for example, a polymer material, a glass epoxy material, and a glass material.

The purge gas nozzle 80 is so disposed that a purge gas flows to a region of the processing receiving object 160 that is the region irradiated with the pulsed laser light. The purge gas nozzle 80 is connected to a purge gas supply source 88 via a pipe 86. The purge gas supplied from the purge gas supply source 88 may be any gas capable of removing substances produced by abrasion. The purge gas may, for example, be an $N_2$ gas or clean dry air.

The discharge duct 90 is so disposed that debris resulting from the abrasion performed by the pulsed laser light flows with the purge gas and is discharged along with the purge gas. The discharge duct 90 is connected to a discharger 98 via a pipe 96.

The laser processing controller 100 is configured to control the operation of the laser apparatus 12, the attenuator 120, the uniaxial stage 138, and the XYZ stage 74.

1.2 Operation

The laser processing controller 100 is configured to read laser processing condition parameters that are radiation condition parameters used when laser processing is performed. Specifically, the laser processing controller 100 is configured to read fluence Fi, the number of radiated pulses Ni, and a repetitive frequency fi on the processing receiving object 160 under the laser processing. The laser processing controller 100 is configured to cause the laser apparatus 12 to perform adjustment oscillation in accordance with the laser processing condition parameters.

The laser controller 28 is configured to receive a target pulse energy Et from the laser processing controller 100. Upon reception of the target pulse energy Et, the laser controller 28 is configured to close the shutter 26 and control the electricity charger 36 in such a way that the target pulse energy Et is achieved.

The laser processing controller 100 is configured to transmit an oscillation start trigger signal to the laser controller 28. The oscillation start trigger signal issued from the laser processing controller 100 is inputted to a switch 39 of the PPM 38 via the laser controller 28. As a result, the oscillator 20 performs natural oscillation.

The pulsed laser light outputted from the oscillator 20 is sampled by the beam splitter 50 of the monitor module 24, and pulse energy E is measured with the optical sensor 52.

Information on the pulse energy E measured with the optical sensor 52 is transmitted to the laser controller 28.

The laser controller 28 is configured to control charging voltage applied to the electricity charger 36 in such a way that a difference $\Delta E$ between measured target pulse energy Et and pulse energy E approaches 0. The laser controller 28 is configured to transmit a pulse energy OK signal to the laser processing controller 100 when $\Delta E$ falls within an acceptable range to open the shutter 26.

The laser processing controller 100 is configured to receive the pulse energy OK signal from the laser controller 28.

The laser processing controller 100 is configured to then control the XYZ stage 74 to move in the X-axis and Y-axis directions in such a way that a processed position on the processing receiving object 160 that is the position to be first irradiated with the laser light is irradiated with the pulsed laser light. The laser processing controller 100 is further configured to control the XYZ stage 74 to move in the Z-axis direction in such a way that the image of the mask 140 is formed at the position of the surface of the processing receiving object 160.

The laser processing controller 100 is configured to calculate transmittance T provided by the attenuator 120 in such a way that the fluence at the position of the surface of the processing receiving object 160, that is, the position of the image of the mask 140 is equal to the target fluence Fi.

The laser processing controller 100 is configured to subsequently control the angles of incidence of the pulsed laser light incident on the two partially reflective mirrors 121 and 122 by using the rotary stages 123 and 124 in such a way that the attenuator 120 provides the transmittance T.

The laser processing controller 100 is configured to subsequently calculate a moving speed Vmx of the uniaxial stage 138 in such a way that the number of radiated pulses Ni at the repetitive frequency fi is achieved when the linear beam has a beam width Bx in the minor axis direction.

The laser processing controller 100 is configured to control the linear beam shaping optical system 130 in such a way that the linear beam shaping optical system 130 makes uniform speed linear motion at the speed of Vmx in the X-axis direction. As a result, the linear beam makes the uniform speed linear motion on the mask 140.

The laser controller 28 is configured to transmit a light emission trigger signal Tr at the repetitive frequency fi during the uniform speed linear motion of the linear beam. The pulsed laser light having passed through the beam splitter 50 of the monitor module 24 enters the laser processing apparatus 14 through the optical path tube 13 in synchronization with the light emission trigger signal Tr.

The pulsed laser light is reflected off the high-reflectance mirror 111 and passes through the attenuator 120, which attenuates the pulsed laser light, and the attenuated pulsed laser light is then reflected off the high-reflectance mirror 112.

The pulsed laser light reflected off the high-reflectance mirror 112 enters the linear beam shaping optical system 130, which spatially homogenizes the optical intensity of the pulsed laser light and shapes the pulsed laser light into the linear beam. The linear beam having exited out of the linear beam shaping optical system 130 is incident on the mask 140. The linear beam moves along the mask 140 at the speed of Vmx in the X-axis direction in accordance with the motion of the uniaxial stage 138.

The pulsed laser light having passed through the mask 140 enters the projection optical system 142, which projects the pulsed laser light with the size thereof reduced on the surface of the processing receiving object 160.

The pulsed laser light passes through the projection optical system 142 and is radiated to the processing receiving object 160 in the region where the image of the mask 140 is transferred and formed. A portion of the surface of the processing receiving object 160 that is the portion irradiated with the pulsed laser light undergoes abrasion or laser processing.

The linear beam radiated onto the mask 140 is projected with the size thereof reduced on the processing receiving object 160 and moves along the processing receiving object 160 at a speed "−M·Vmx" in the direction opposite the moving direction of the uniaxial state 138. M represents the magnification factor of the projection optical system 142. Since the projection optical system 142 is a reduction/transfer optical system, M is a positive value smaller than 1.

Figure 2:
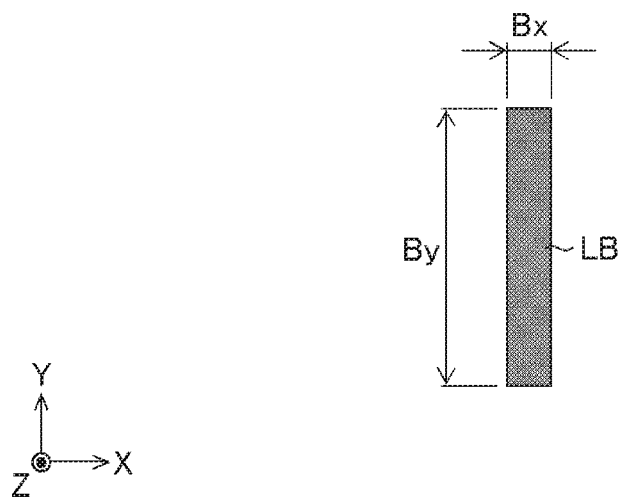
FIG. 2 shows an example of the beam shape of a linear beam.

FIG. 2 shows an example of the linear beam with which the processing receiving object 160 is irradiated. A linear beam LB has a rectangular beam shape having a beam width Bx in the X-axis direction, which is the direction of the minor axis of the linear beam LB, and a beam width By in the Y-axis direction, which is the direction of the major axis of the linear beam LB.

Figure 3:
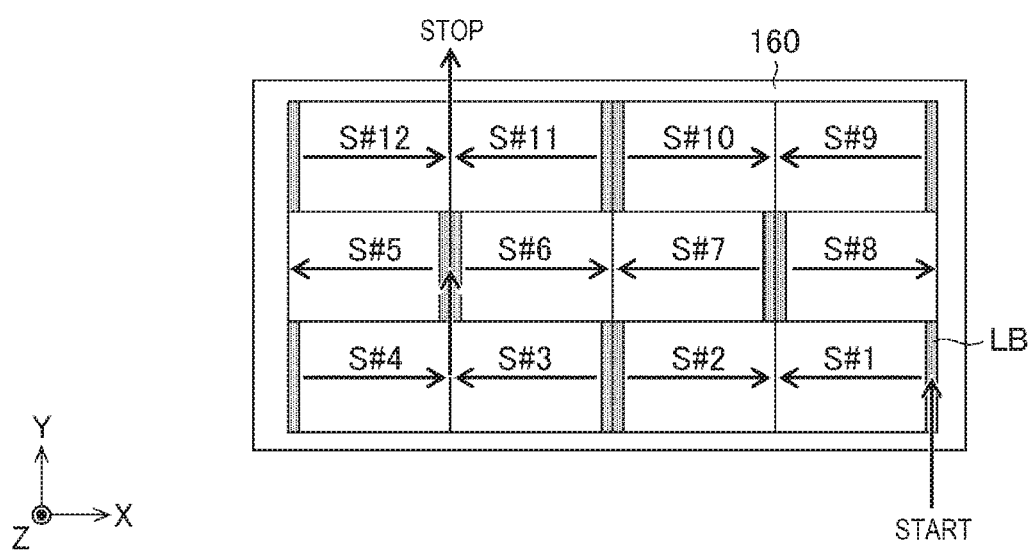
FIG. 3 is a plan view showing an example of a laser processing method using a linear beam scan scheme for processing a processing receiving object.

FIG. 3 is a plan view showing an example of a laser processing method using a linear beam scan scheme for processing a processing receiving object. FIG. 3 shows an example of the processing order and the linear beam moving direction based on the linear beam scan scheme for each processing target region of the processing receiving object. In FIG. 3, the processing surface of the processing receiving object 160 is segmented into 12 processing target regions, "S #1" to "S #12." The linear beam scanning is performed on a processing target region basis with the processing target region changed in the order of "S #1"→"S #2"→ "S #3"→ . . . →"S #12." The laser processing is thus performed.

The arrow shown in each of the processing target regions represents the scan direction of the linear beam LB. The right end of a first processing target region S #1, which is the processing target region to be processed first, is the initial position of the linear beam LB. The linear beam LB starts moving (laser processing) from the initial position. In FIG. 3, the position of the linear beam LB in the processing start position in each of the processing target regions is drawn in the form of a rectangular filled pattern.

To process the first processing target region S #1, the linear beam LB is moved from the initial position leftward in FIG. 3 and then moved to the left end of the first processing target region S #1. The processing of the first processing target region S #1 is completed by the one linear beam scan action.

The XYZ stage 74 is so controlled in the X-axis direction and/or the Y-axis direction that when the linear beam scan in the X-axis direction is completed in one processing target region, the beam radiation is stopped, and the region irradiated with the linear beam is moved to the processing start position of the following processing target region of the processing receiving object 160. The XYZ stage 74 is driven in the period for which the linear beam is not radiated.

For example, after the first processing target region S #1 is processed, the XYZ stage 74 is so controlled as to move in the X-axis direction and cause the position of the linear beam LB to move to the left end of the second processing target region S #2. To process the second processing target region S #2, the beam is radiated with the uniaxial stage 138 being moved, and the region irradiated with the linear beam LB is moved from the left end to the right end of the second processing target region S #2. The uniaxial stage 138 causes the linear beam LB to make reciprocal motion in the X-axis direction.

As described above, the movement of the linear beam in the X-axis direction during the laser processing of each of the processing target regions is achieved by controlling the uniaxial stage 138, and the movement of the processing receiving object 160 to change the current processing target region to another is achieved by controlling the XYZ stage 74. The uniaxial stage 138 causes the linear beam LB to make reciprocal motion in the X-axis direction.

The linear beam scan action and the action of moving the processing receiving object 160 described above are alternately repeated until the processing receiving object 160 has no unprocessed target region.

In this process, the linear beam scan direction is so controlled as to be reversed whenever the XYZ stage 74 moves the processing receiving object 160 (see FIG. 3).

As described above, the laser processing system 10 is configured to perform the laser processing by moving the linear beam in the X-axis direction on a processing target region basis to radiate the pulsed laser light. The laser processing system 10 is then configured to perform the laser processing using the linear beam scan scheme by successively changing the current processing target region to another and switching the linear beam scan direction from one to the other.

1.3 Example of Control Performed by Laser Processing System

Figure 4:
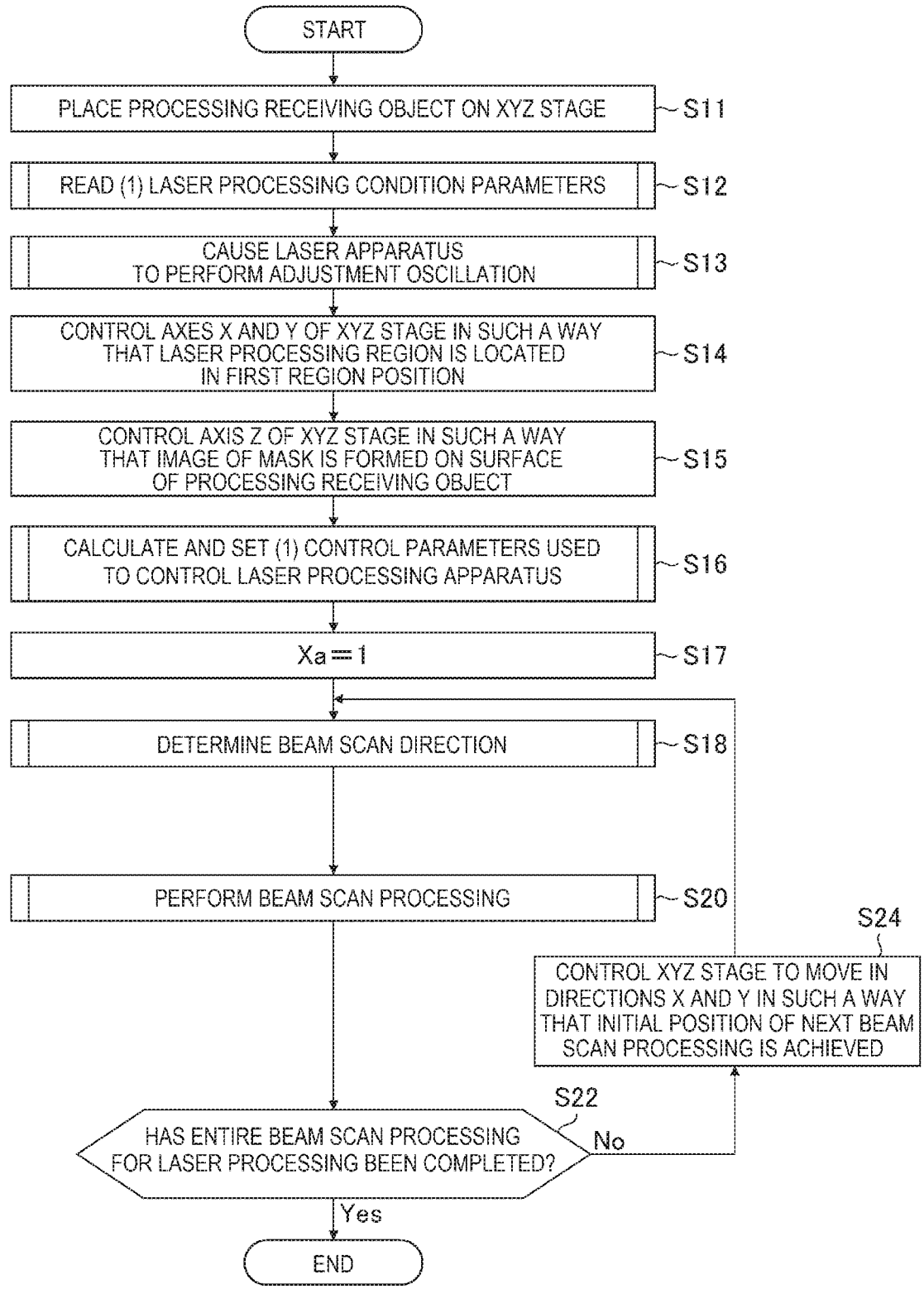
FIG. 4 is a flowchart showing an example of control performed by the laser processing system.

FIG. 4 is a flowchart showing an example of the control performed by the laser processing system. In step S11, the processing receiving object 160 is placed on the table 76 on the XYZ stage 74. The processing receiving object 160 may be placed on the table 76 by a workpiece conveying robot or any other automatic conveyer that is not shown. After the processing receiving object 160 is placed on the table 76, an alignment optical system that is not shown allows determination of the position of the processing receiving object 160 on the table 76 for alignment with the processing position.

In step S12, the laser processing controller 100 reads the laser processing condition parameters. The laser processing condition parameters are laser radiation condition parameters used when the laser processing is performed.

Figure 5:
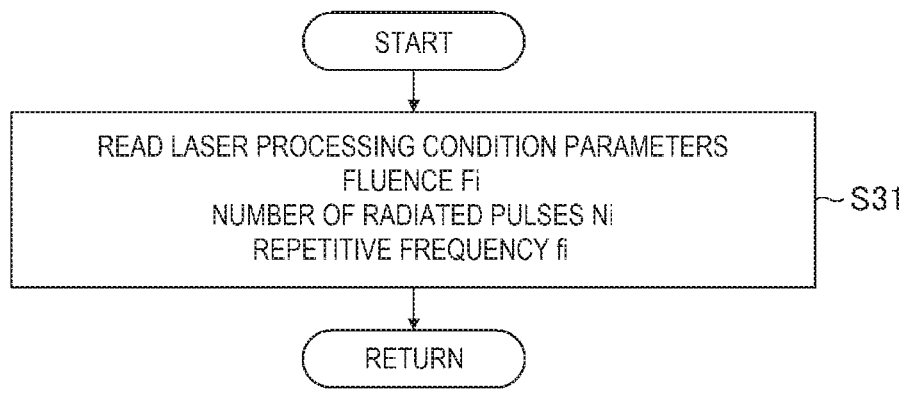
FIG. 5 is a flowchart showing an example of the content of the process of reading (1) laser processing condition parameters.

FIG. 5 is a flowchart showing an example of the content of the process of reading (1) the laser processing condition parameters. The flowchart shown in FIG. 5 is applied to the process in step S12 in FIG. 4.

In step S31, the laser processing controller 100 reads the fluence Fi, the number of radiated pulses Ni, and the repetitive frequency fi on the processing receiving object 160 under the laser processing. The number of radiated pulses Ni is an integer greater than or equal to 2. After step S31, the laser processing controller 100 returns to the main procedure in FIG. 4.

In step S13, the laser processing controller 100 causes the laser apparatus 12 to perform adjustment oscillation. The laser processing controller 100 is configured to cause the laser apparatus 12 to perform adjustment oscillation at the repetitive frequency fi in such a way that the target pulse energy Et is achieved.

Figure 6:
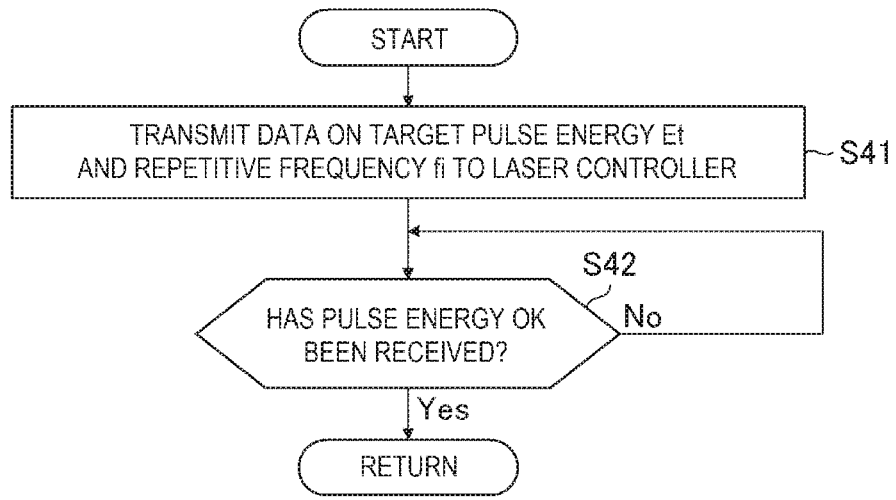
FIG. 6 is a flowchart showing an example of the content of the process carried out when a laser apparatus performs adjustment oscillation.

FIG. 6 is a flowchart showing an example of the content of the process carried out when the laser apparatus performs the adjustment oscillation. The flowchart shown in FIG. 6 is applied to step S13 in FIG. 4. In step S41 in FIG. 6, the laser processing controller 100 transmits data on the target pulse energy Et and the repetitive frequency fi to the laser controller 28. The target pulse energy Et and the repetitive frequency fi in this case are preferably rated data that allow the laser apparatus 12 to stably operate. For example, the target pulse energy Et may fall within a range from 30 to 100 millijoules [mJ]. The repetitive frequency fi may fall within a range from 100 to 6000 hertz [Hz]. The laser processing controller 100 is configured to store in advance the rated pulse energy provided by the laser apparatus 12 as the target pulse energy Et.

In step S42, the laser processing controller 100 evaluates whether or not the pulse energy OK signal has been received from the laser controller 28. The evaluation in step S42 corresponds to the evaluation of whether or not the difference between the pulse energy E of pulsed laser light outputted from the laser apparatus 12 and the target pulse energy Et falls within the acceptable range.

The laser processing controller 100 repeats step S42 until the result of the evaluation in step S42 becomes Yes. When the result of the evaluation in step S42 becomes Yes, the laser processing controller 100 leaves the flowchart of FIG. 6 and returns to the main procedure in FIG. 4.

In step S14, the laser processing controller 100 controls the XYZ stage 74 to move in the X-axis and Y-axis directions in such a way that the laser processing region is located in the first region position.

In step S15, the laser processing controller 100 controls the XYZ stage 74 to move in the Z-axis direction in such a way that the image of the mask 140 is formed on the surface of the processing receiving object 160.

In step S16, the laser processing controller 100 calculates and sets control parameters used to control the laser processing apparatus 14. The control parameters used to control the laser processing apparatus 14 include control parameters used when the laser processing is performed. Specifically, the laser processing controller 100 is configured to calculate the transmittance T provided by the attenuator 120 in such a way that the fluence Fi and the number of radiated pulses Ni are achieved when the beam width of the linear beam in the direction of the minor axis thereof is Bx and sets the determined transmittance T.

The laser processing controller 100 is further configured to calculate a moving speed Vx of the linear beam on the processing receiving object 160 and calculate based on the value of the moving speed Vx an absolute value Vxm of the moving speed of the uniaxial stage 138 in the linear beam shaping optical system 130.

Figure 7:
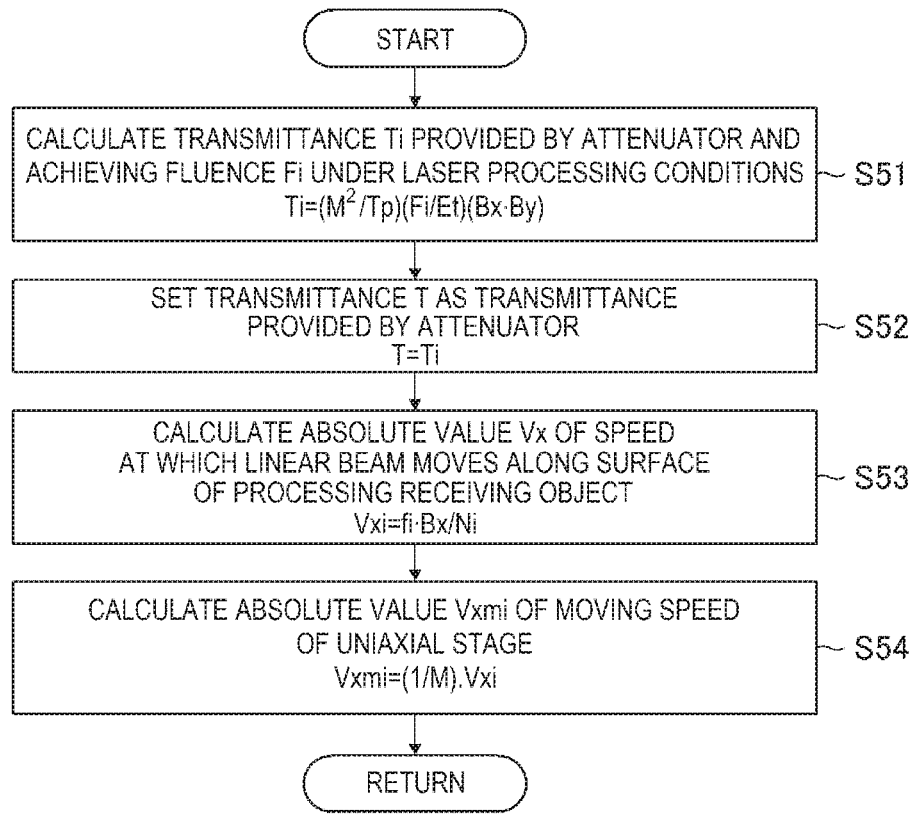
FIG. 7 is a flowchart showing an example of the content of the process of calculating and setting (1) control parameters used to control the laser processing apparatus.

FIG. 7 is a flowchart showing an example of the content of the process of calculating and setting (1) the control parameters used to control the laser processing apparatus. The flowchart shown in FIG. 7 is applied to step S16 in FIG. 4. In step SM in FIG. 7, the laser processing controller 100 calculates transmittance Ti provided by the attenuator 120 and achieving the fluence Fi under the laser processing conditions.

The fluence at the surface of the processing receiving object is expressed by Expression (1) below.

$$F = M^{-2}(T \cdot Tp \cdot Et)/(Bx \cdot By) \quad (1)$$

M in the expression represents the magnification factor of the projection optical system 142. M may range, for example, from ½ to ¼.

Tp in the expression represents the transmittance provided by the optical system throughout the path along which the pulsed laser light outputted from the laser apparatus 12 when the attenuator 120 provides the maximum transmittance reaches the processing receiving object 160.

Based on Expression (1), the transmittance Ti provided by the attenuator 120 is determined from Expression (2) below.

$$Ti = (M^2/Tp)(Fi/Et)(Bx \cdot By) \quad (2)$$

In step S52, the laser processing controller 100 sets the transmittance T provided by the attenuator 120 at Ti. That is, the laser processing controller 100 is configured to control the angles of the partially reflective mirrors 121 and 122 in such a way that the transmittance T provided by the attenuator 120 is equal to Ti.

In step S53, the laser processing controller 100 then calculates an absolute value Vxi of the speed at which the linear beam moves along the surface of the processing receiving object 160.

Let Vxi be the absolute value of the moving speed of the linear beam, and the number of radiated pulses Ni used when the laser processing is performed is expressed by Expression (3) below.

$$Ni = fi \cdot Bx/Vxi \quad (3)$$

Based on Expression (3), the absolute value Vxi of the moving speed of the linear beam is determined from Expression (4) below.

$$Vxi = fi \cdot Bx/Ni \quad (4)$$

Ni in Expression (4) is the number of pulses by which the pulsed laser light is radiated to a single position on the processing target region (Ni≥2).

In step S54, the laser processing controller 100 calculates an absolute value Vxmi of the moving speed of the uniaxial stage 138. The laser processing controller 100 is configured to calculate the absolute value Vxmi of the moving speed of the uniaxial stage 138 in the linear beam shaping optical system 130 at the time of the laser processing using the linear beam scanning in consideration of the magnification factor M of the projection optical system 142, which is a reduction/transfer optical system.

The absolute value Vxmi of the moving speed of the uniaxial stage 138 is determined from Expression (5) below.

$$Vxmi = (1/M) \cdot Vxi \quad (5)$$

After step S54, the laser processing controller 100 leaves the flowchart of FIG. 7 and returns to the main procedure in FIG. 4.

In step S17 in FIG. 4, the laser processing controller 100 sets the value of a parameter Xa, which represents the beam scan direction on the processing receiving object 160, at an initial value of "1".

In step S18, the laser processing controller 100 then determines the beam scan direction. For example, the laser processing controller 100 is configured to replace the current parameter Xa with the parameter Xa having the opposite sign, positive or negative. That is, the laser processing controller 100 is configured to set the beam scan direction in such a way that the precedingly set beam scan direction is reversed.

Figure 8:
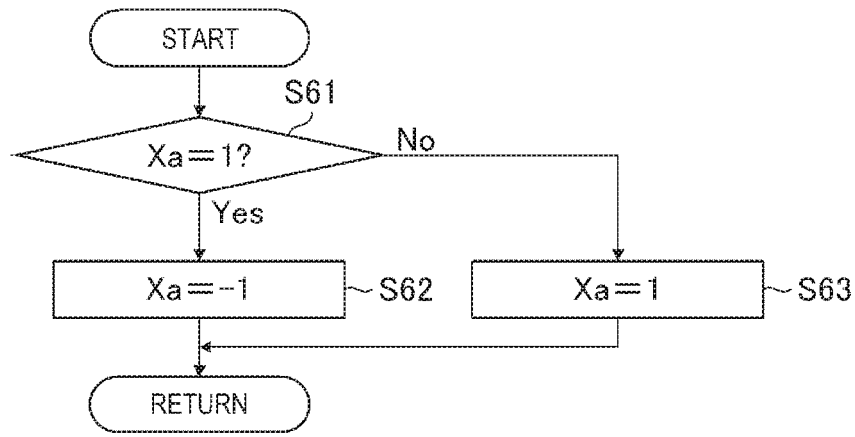
FIG. 8 is a flowchart showing an example of the content of the process of determining a beam scan direction.

FIG. 8 is a flowchart showing an example of the content of the process of determining the beam scan direction. The flowchart shown in FIG. 8 is applied to step S18 in FIG. 4. In step S61 in FIG. 8, the laser processing controller 100 evaluates whether or not the parameter Xa is equal to 1.

When the result of the evaluation in step S61 is Yes, that is, when Xa is equal to 1, the laser processing controller 100 proceeds to step S62 and sets Xa at −1.

On the other hand, when the result of the evaluation in step S61 is No, that is, when Xa is equal to −1, the laser processing controller 100 proceeds to step S63 and sets Xa at 1.

The state in which Xa is equal to 1 represents that the linear beam moves along the surface of the processing receiving object 160 toward the positive side of the axis X. The state in which Xa is equal to −1 represents that the linear beam moves along the surface of the processing receiving object 160 toward the negative side of the axis X.

After step S62 or step S63, the laser processing controller 100 leaves the flowchart of FIG. 8 and returns to the main procedure in FIG. 4.

In step S20 in FIG. 4, the laser processing controller 100 causes the laser processing apparatus 14 to perform the beam scan processing. In the beam scan processing, the processing receiving object 160 is irradiated with the pulsed laser light at the repetitive frequency fi, the fluence Fi, and the number of radiated pulses Ni set in step S12.

Figure 9:
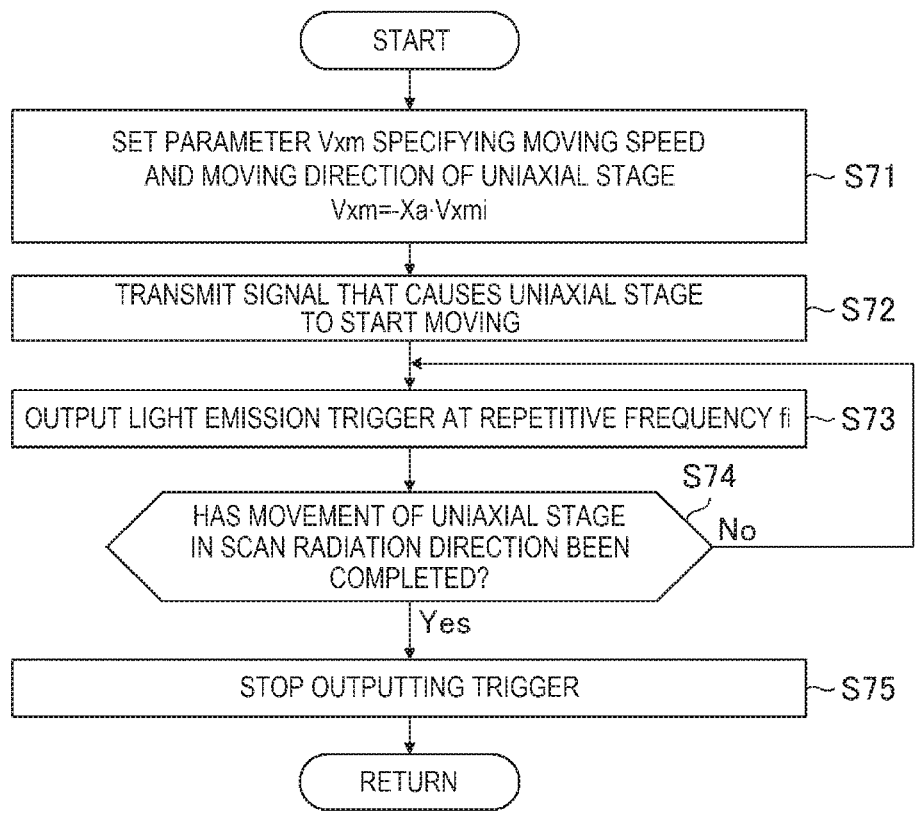
FIG. 9 is a flowchart showing an example of the content of the process of performing beam scan processing.

FIG. 9 is a flowchart showing an example of the content of the process of performing the beam scan processing. The flowchart shown in FIG. 9 is applied to step S20 in FIG. 4. In step S71 in FIG. 9, the laser processing controller 100 sets a parameter Vxm, which specifies the moving speed and the moving direction of the uniaxial stage 138. Vxm is determined in accordance with Expression (6) below.

$$Vxm = -Xa \cdot Vxmi \quad (6)$$

In practice, the parameters are so set that acceleration, uniform speed linear motion, and deceleration are each performed for a predetermined period in correspondence with the distance over which the beam scan is performed. In the description, a case where Vxm represents the speed of the uniaxial stage 138 making uniform linear motion is presented by way of example for simplification of the description.

When Vxm specified by Expression (6) has a negative value, the uniaxial stage 138 is moved toward the positive side of the axis X. As a result, the linear beam moves along the surface of the processing receiving object 160 toward the negative side of the axis X.

When Vxm specified by Expression (6) has a positive value, the uniaxial stage 138 is moved toward the negative side of the axis X. As a result, the linear beam moves along the surface of the processing receiving object 160 toward the positive side of the axis X.

In step S72, the laser processing controller 100 transmits a uniaxial stage movement start signal. The uniaxial stage movement start signal is a control signal that causes the uniaxial stage 138 to start moving.

In step S73, the laser processing controller 100 outputs the light emission trigger signal at the repetitive frequency fi.

In step S74, the laser processing controller 100 evaluates whether or not the movement of the uniaxial stage 138 in a scan radiation direction has been completed. The scan radiation direction of the uniaxial stage 138 means the direction in which the linear beam to be radiated onto the mask 140 moves. Steps S73 and S74 are repeated until the movement of the uniaxial stage 138 in the scan radiation direction is completed, that is, when the result of the evaluation in step S74 is No. For the period from the start of the linear beam scanning to the end thereof, the laser processing controller 100 is configured to output the light emission trigger signal to the laser controller 28 at the repetitive frequency fi during the uniform speed linear motion of the uniaxial stage 138. The processing target region of the processing receiving object 160 is thus irradiated with the pulsed laser light at the repetitive frequency fi.

When the result of the evaluation in step S74 is Yes, that is, when the linear beam scanning performed on one processing target region is completed and the movement of the uniaxial stage 138 is completed, the laser processing controller 100 proceeds to step S75 and stops outputting the light emission trigger signal. The laser apparatus 12 thus stops outputting the pulsed laser light.

After step S75, the laser processing controller 100 leaves the flowchart of FIG. 9 and returns to the main procedure in FIG. 4.

In step S22, the laser processing controller 100 evaluates whether or not the entire beam scan processing for the laser processing has been completed. When the result of the evaluation in step S22 is No, the laser processing controller 100 proceeds to step S24. The laser processing controller 100 is configured to control the XYZ stage 74 to move in the X-axis and Y-axis directions in such a way that the initial position of the following beam scan processing is achieved and returns to step S18. The laser processing controller 100 repeats steps S18 to S22 until the entire beam scan processing performed on the processing target regions is completed. When the entire beam scan processing is completed, so that the result of the evaluation in step S22 is Yes, the flowchart of FIG. 4 is terminated.

In the example described with reference to FIGS. 4 to 9, to perform one linear beam scanning radiation action, the pulsed laser light is outputted at the fixed repetitive frequency fi for the period from the start to the end of the movement of the uniaxial stage 138 for ease of description, but not necessarily. For example, the pulsed laser light may not be radiated when the uniaxial stage 138 is accelerated or decelerated because the processing receiving object 160 is not irradiated with the linear beam in this period. In this case, the number of pulses of the pulsed laser light outputted by the laser apparatus 12 can be reduced to a smaller number.

2. Description of Terms

The term "debris" refers to a substance scattered off the surface of a processing receiving object due to abrasion in laser processing in which the processing receiving object is irradiated with laser light. The debris may be fine particles, gas, or the combination thereof.

The "linear beam scan scheme" refers to a laser light radiation scheme in which an image of a mask is formed on the surface of a processing receiving object via a projection optical system and the scheme including irradiating the mask with a linearly shaped laser light beam and moving the beam at a uniform speed to irradiate the surface of the processing receiving object with the laser light with the linear beam moving at uniform speed. The "beam scan direction" is the direction in which the beam moves along the surface of the processing receiving object in the abrasion processing.

3. Problems

In the configuration shown in FIG. 1, when the laser processing using the linear beam scan scheme is performed, the processing rate varies along the processing surface of the processing receiving object 160 or the problem of a poor processing rate in a central portion of the processing surface has been occurred. As one cause of the problem described above, it is believed that the processing rate decreases because the laser light is blocked by the debris produced in the laser processing. Another cause of the problem is believed to be a decrease in the processing rate due to reattachment of the produced debris to the processing surface.

Figure 10:
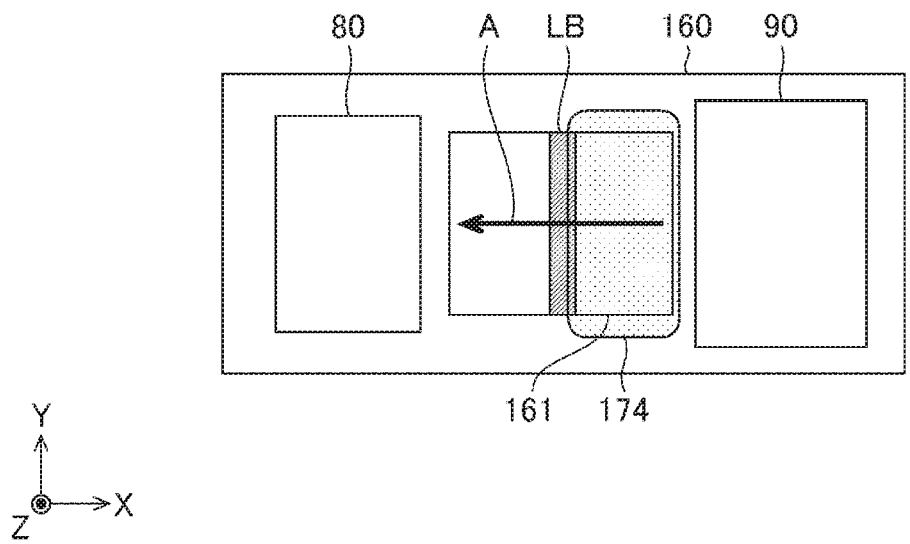
FIG. 10 is a plan view diagrammatically showing a linear beam scan action.

FIG. 10 is a plan view diagrammatically showing the linear beam scan action. FIG. 10 shows for ease of description a case where a single processing target region of the processing receiving object 160 is a beam scan region 161. The arrow A in FIG. 10 represents the linear beam scan direction. When the processing receiving object 160 is irradiated with the linear beam LB, debris 174 is produced. In FIG. 10, the region over which the debris 174 is scattered is diagrammatically illustrated in the form of a dotted pattern.

Figure 11:
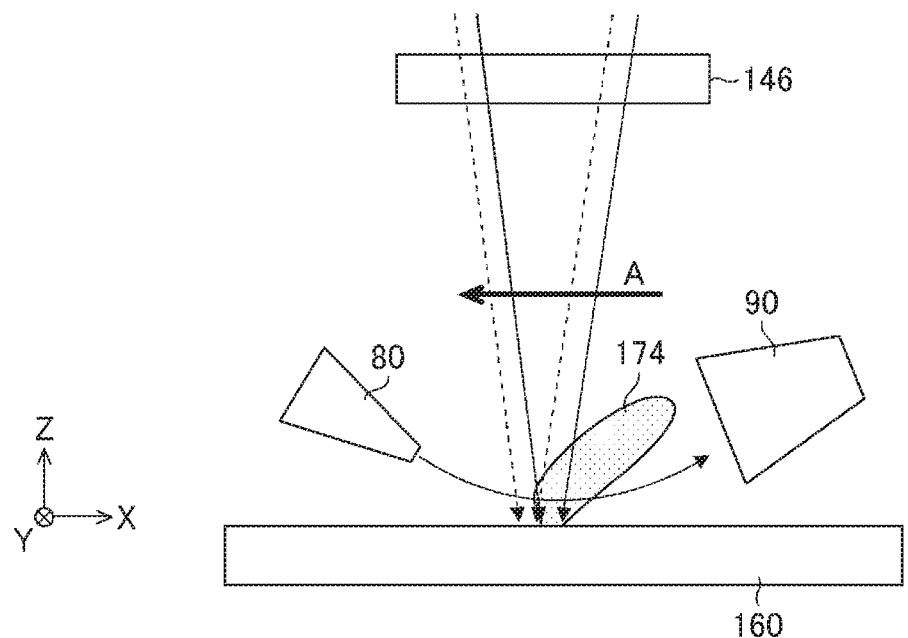
FIG. 11 is a side view of the configuration shown in FIG. 10.

FIG. 11 is a side view of the configuration shown in FIG. 10. In FIGS. 10 and 11, the linear beam scanning is performed toward the negative side of the axis X. That is, in FIG. 10, the processing receiving object 160 is irradiated with the linear beam with the linear beam moving along the surface of the processing receiving object 160 toward the negative side of the axis X.

During the beam scan action, the purge gas is sprayed via the purge gas nozzle 80. The debris 174 produced in the laser processing is collected by the discharge duct 90. In the example shown in FIGS. 10 and 11, the purge gas is sprayed via the purge gas nozzle 80 disposed on the front side of the linear beam scan direction (side toward which linear beam LB travels), and the debris 174 is collected by the discharge duct 90 disposed on the rear side of the linear beam scan direction.

The debris 174 therefore flows toward the processed region having been already irradiated with the linear beam LB, that is, toward the rear side of the linear beam scan direction. Diffusion of the debris to regions that have not been irradiated with the linear beam is thus suppressed.

Figure 12:
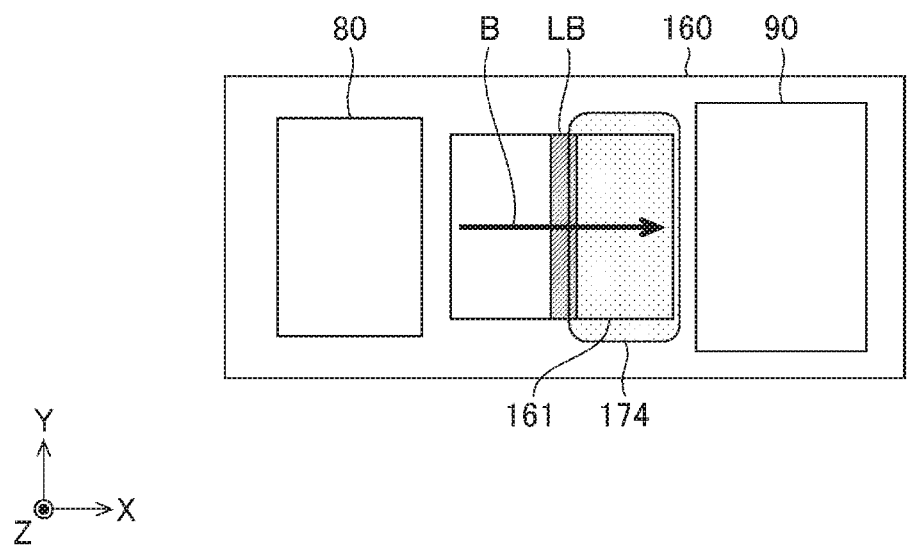
FIG. 12 is a plan view diagrammatically showing the linear beam scan action in the direction opposite the direction in the example shown in FIG. 10.
Figure 13:
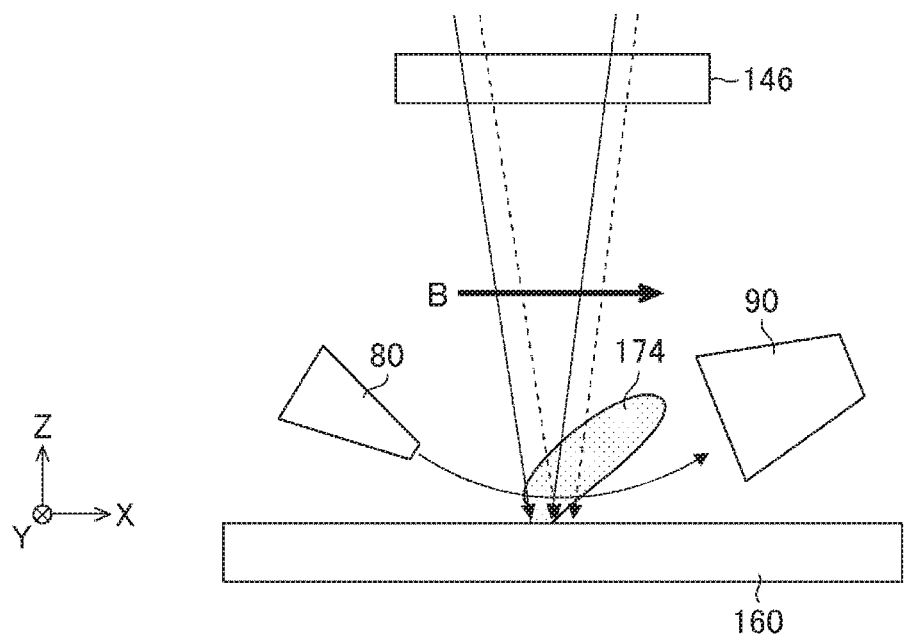
FIG. 13 is a side view of the configuration shown in FIG. 12.

FIGS. 12 and 13 show a case where the linear beam scan direction is reversed as compared with FIGS. 10 and 11. FIG. 12 is a plan view, and FIG. 13 is a side view of the configuration shown in FIG. 12. The arrow B in FIG. 12 represents the linear beam scan direction.

In FIGS. 12 and 13, the linear beam scanning is performed toward the positive side of the axis X. That is, in FIG. 12, the processing receiving object 160 is irradiated with the linear beam LB moving along the surface of the processing receiving object 160 toward the positive side of the axis X. During the linear beam scan action, the purge gas is sprayed via the purge gas nozzle 80. The debris 174 produced in the laser processing is collected by the discharge duct 90. In the example shown in FIGS. 12 and 13, the purge gas is sprayed via the purge gas nozzle 80 disposed on the rear side of the linear beam scan direction, and the debris 174 is collected by the discharge duct 90 disposed on the front side of the linear beam scan direction.

The debris 174 therefore flows toward unprocessed regions that have not been irradiated with the linear beam LB, that is, toward the front side of the linear beam scan direction. The debris is therefore diffused to regions that have not been irradiated with the linear beam.

The debris 174 blocks the laser linear beam LB, as shown in FIGS. 12 and 13, to lower the processing rate. Further, reattachment of the produced debris 174 to the unprocessed surface may lower the processing rate.

4. First Embodiment

4.1 Configuration

Figure 14:
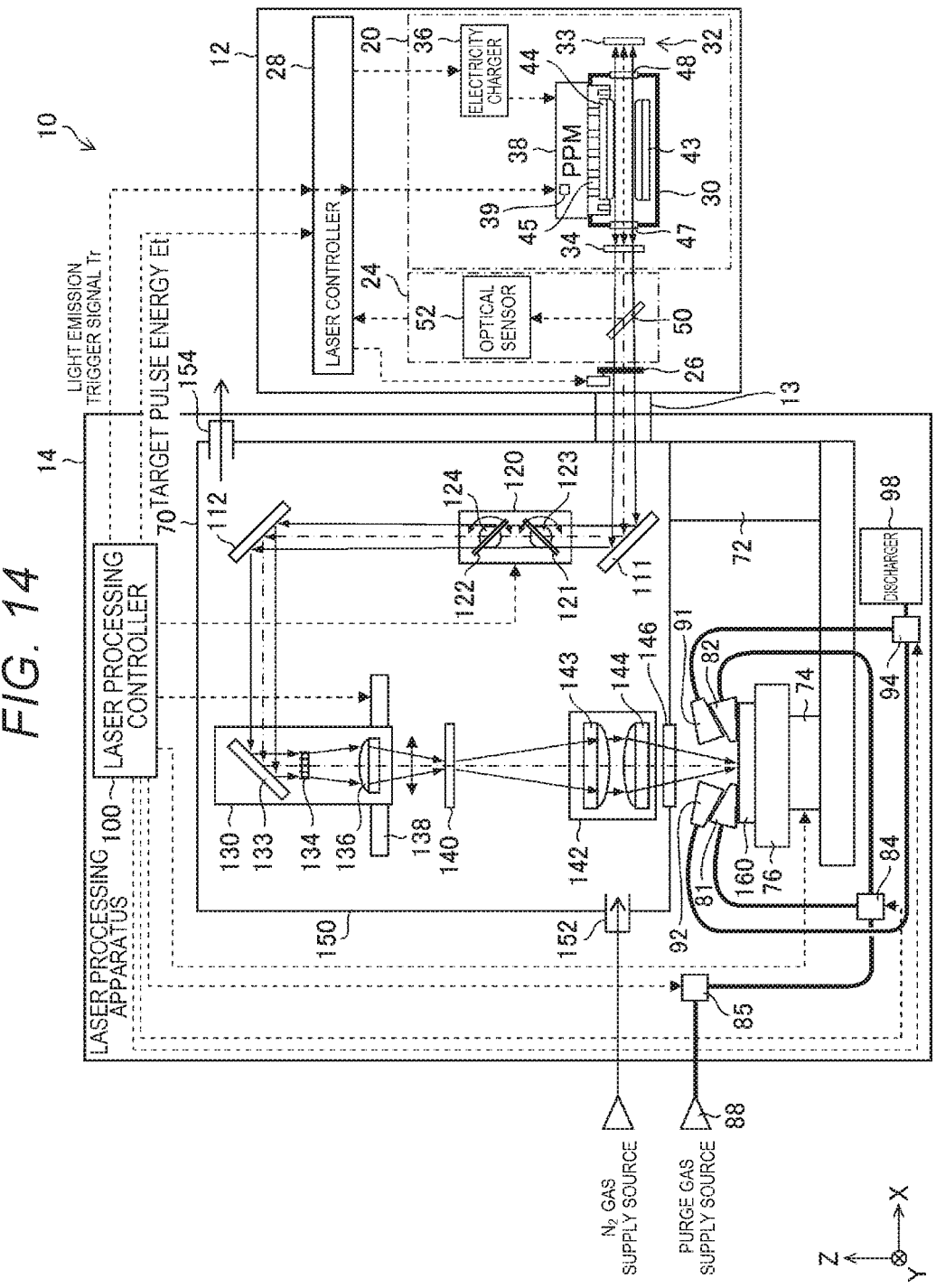
FIG. 14 schematically shows the configuration of a laser processing system including a laser processing apparatus according to a first embodiment.

FIG. 14 schematically shows the configuration of a laser processing system including a laser processing apparatus according to a first embodiment. Differences from the laser processing system 10 shown in FIG. 1 will be described.

The laser processing apparatus 14 according to the first embodiment shown in FIG. 14 includes a first purge gas nozzle 81, a second purge gas nozzle 82, a purge gas switching valve 84, and a gas flow rate control valve 85. The laser processing apparatus 14 further includes a first discharge duct 91, a second discharge duct 92, and a discharge gas switching valve 94.

The first purge gas nozzle 81 and the second purge gas nozzle 82 are so disposed as to face each other in the X-axis direction with the beam scan region 161 of the processing receiving object 160 interposed between the two nozzles. The first discharge duct 91 and the second discharge duct 92 are also so disposed as to face each other in the X-axis direction with the beam scan region 161 of the processing receiving object 160 interposed between the two ducts.

The first purge gas nozzle 81 is connected to the purge gas switching valve 84 via a pipe. The second purge gas nozzle 82 is connected to the purge gas switching valve 84 via a pipe. The purge gas switching valve 84 is configured to be capable of switching the purge gas supply port between the first purge gas nozzle 81 and the second purge gas nozzle 82 in accordance with a switching instruction signal outputted from the laser processing controller 100.

The gas flow rate control valve 85 is disposed in a halfway position of the passage from the purge gas supply source 88 and the purge gas switching valve 84. The gas flow rate control valve 85 is configured to adjust the flow rate of the purge gas in accordance with a flow rate control signal outputted from the laser processing controller 100.

The first discharge duct 91 is connected to the discharge gas switching valve 94 via a pipe. The second discharge duct 92 is connected to the discharge gas switching valve 94 via a pipe. The discharge gas switching valve 94 is configured to be capable of switching the debris-containing gas recovery port between the first discharge duct 91 and the second discharge duct 92 in accordance with a switching instruction signal outputted from the laser processing controller 100.

4.2 Operation

The operation of the laser processing apparatus 14 according to the first embodiment and configured as shown in FIG. 14 will be described. The laser processing controller 100 is configured to control switching the combination of a purge gas nozzle via which the purge gas is sprayed and a discharge duct via which the gas is recovered from one to another in accordance with the scan direction of the linear beam that processes the processing receiving object 160.

When the beam scanning is performed toward the negative side of the axis X, the first purge gas nozzle 81 is selected as the purge gas supply port, and the first discharge duct 91 is selected as the debris-containing gas recovery port. That is, the purge gas is sprayed out of the first purge gas nozzle 81 and sucked into the first discharge duct 91. In this process, the purge gas is not sprayed out of the second purge gas nozzle 82 and is not sucked into the second discharge duct 92.

The flow of the purge gas from the first purge gas nozzle 81 toward the first discharge duct 91 is thus formed. The direction of the flow of the purge gas flowing from the first purge gas nozzle 81 to the first discharge duct 91 is opposite the direction in which the linear beam moves along the radiation region of the processing receiving object 160.

Figure 15:
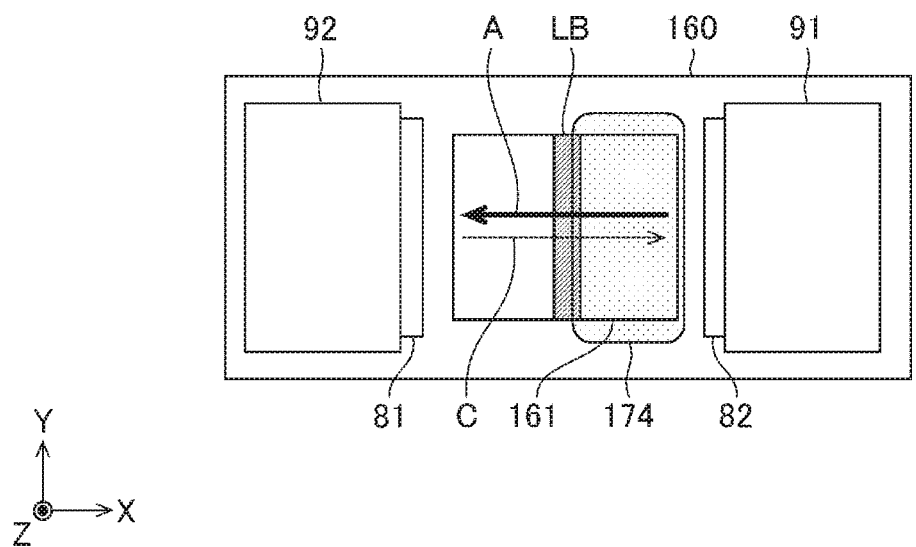
FIG. 15 is a plan view diagrammatically showing the linear beam scan action in a case where the beam scanning is performed toward the negative side of an axis X.
Figure 16:
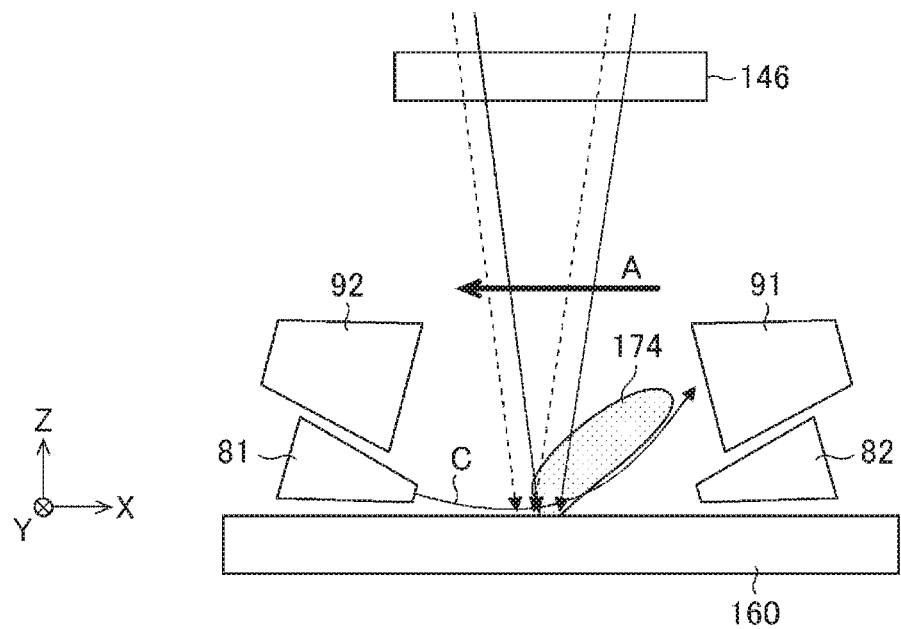
FIG. 16 is a side view of the configuration shown in FIG. 15.

FIG. 15 is a plan view diagrammatically showing the linear beam scan action in the case where the beam scanning is performed toward the negative side of the axis X. FIG. 16 is a side view of the configuration shown in FIG. 15. In FIGS. 15 and 16, the same element as an element in the configuration described with reference to FIGS. 10 and 11 has the same reference character. The arrow C in FIG. 15 represents the direction of the flow of the purge gas. When the processing receiving object 160 is irradiated with the linear beam LB, the debris 174 is produced.

During the beam scan action, the purge gas is sprayed via the first purge gas nozzle 81. The debris 174 produced in the laser processing is collected by the first discharge duct 91. The purge gas is sprayed via the first purge gas nozzle 81 disposed on the front side of the linear beam scan direction, and the debris 174 is collected by the first discharge duct 91 disposed on the rear side of the linear beam scan direction, as in the example described with reference to FIGS. 10 and 11.

The debris 174 therefore flows toward the processed region having been already irradiated with the linear beam LB, that is, toward the rear side of the linear beam scan direction. Diffusion of the debris to regions that have not been irradiated with the linear beam is thus suppressed.

The case where the beam scanning is performed toward the positive side of the axis X will next be described. When the beam scanning is performed toward the positive side of the axis X, the second purge gas nozzle 82 is selected as the purge gas supply port, and the second discharge duct 92 is selected as the debris-containing gas recovery port. That is, the purge gas is sprayed out of the second purge gas nozzle 82 and sucked into the second discharge duct 92. In this process, the purge gas is not sprayed out of the first purge gas nozzle 81 and is not sucked into the first discharge duct 91. The flow of the purge gas from the second purge gas nozzle 82 toward the second discharge duct 92 is thus formed. The direction of the flow of the purge gas flowing from the second purge gas nozzle 82 to the second discharge duct 92 is opposite the direction in which the linear beam LB moves along the radiation region of the processing receiving object 160.

Figure 17:
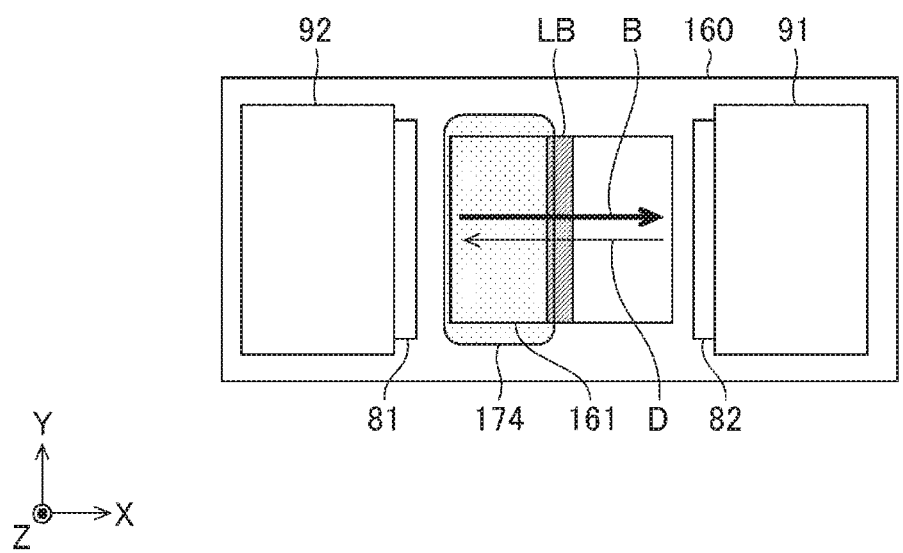
FIG. 17 is a plan view diagrammatically showing the linear beam scan action in a case where the beam scanning is performed toward the positive side of the axis X.
Figure 18:
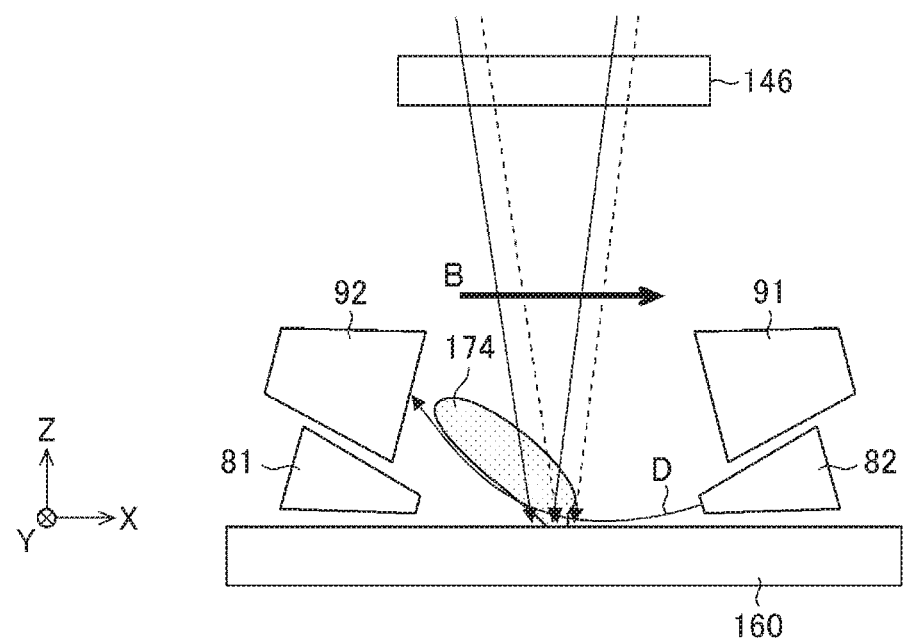
FIG. 18 is a side view of the configuration shown in FIG. 17.

FIG. 17 is a plan view diagrammatically showing the linear beam scan action in the case where the beam scanning is performed toward the positive side of the axis X. FIG. 18 is a side view of the configuration shown in FIG. 17. The arrow D in FIG. 17 represents the direction of the flow of the purge gas. When the processing receiving object 160 is irradiated with the linear beam LB, the debris 174 is produced.

During the beam scan action, the purge gas is sprayed via the second purge gas nozzle 82. The debris 174 produced in the laser processing is collected by the second discharge duct 92. The purge gas is sprayed via the second purge gas nozzle 82 disposed on the front side of the linear beam scan direction, and the debris 174 is collected by the second discharge duct 92 disposed on the rear side of the linear beam scan direction.

The debris 174 therefore flows toward the processed region having been already irradiated with the linear beam LB, that is, toward the rear side of the linear beam scan direction. Diffusion of the debris to regions that have not been irradiated with the linear beam is thus suppressed.

As described above, the purge gas is supplied via one of the first purge gas nozzle 81 and the second purge gas nozzle 82 that is the purge gas nozzle disposed on the forward side of the beam scan direction. The debris-containing gas is then recovered via one of the discharge ducts (first discharge duct 91 or second discharge duct 92) that is the duct disposed on the side opposite the side where the selected purge gas nozzle is disposed, that is, on the side opposite the side toward which the beam scanning is performed.

When the beam scan direction is changed and becomes opposite the preceding beam scan direction, the combination of the purge gas nozzle via which the purge gas is sprayed and the discharge duct via which the debris is collected is so changed that the direction of the gas flow is changed to the direction opposite the preceding gas flow direction. That is, the direction of the purge gas flow is changed in accordance with the change in the beam scan direction.

The laser processing controller 100 is configured to achieve the actions described above by controlling the switching of the purge gas switching valve 84 and the discharge gas switching valve 94 in accordance with the beam scan direction.

Figure 19:
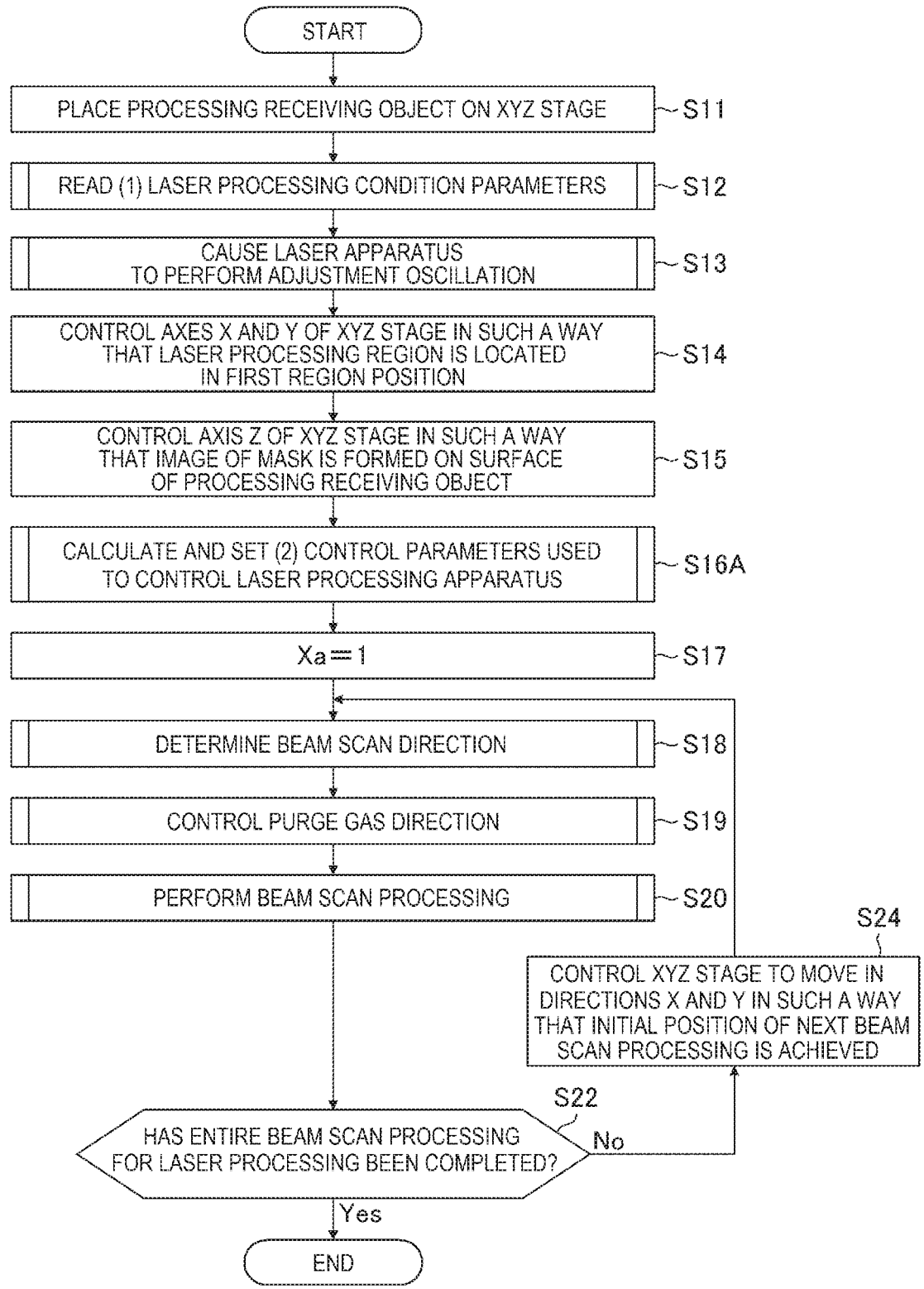
FIG. 19 is a flowchart showing an example of the control performed by the laser processing system including the laser processing apparatus according to the first embodiment.

FIG. 19 is a flowchart showing an example of the control performed by the laser processing system including the laser processing apparatus according to the first embodiment. In FIG. 19, differences from the flowchart described with reference to FIG. 4 will be described. The flowchart shown in FIG. 19 includes step S16A in place of step S16 in FIG. 4.

The flowchart shown in FIG. 19 further includes the step of controlling the direction of the purge gas (step S19) between steps S18 and S20.

Step S16A includes the process of calculating a flow speed Vpgi of the purge gas based on the repetitive frequency fi and the beam width Bx of the linear beam in the minor axis direction in addition to the process of calculating and setting the control parameters described in step S16 in FIG. 4. Step S16A further includes the process of calculating a flow rate Qpg of the purge gas based on Vpgi and controlling the flow rate of the purge gas.

Figure 20:
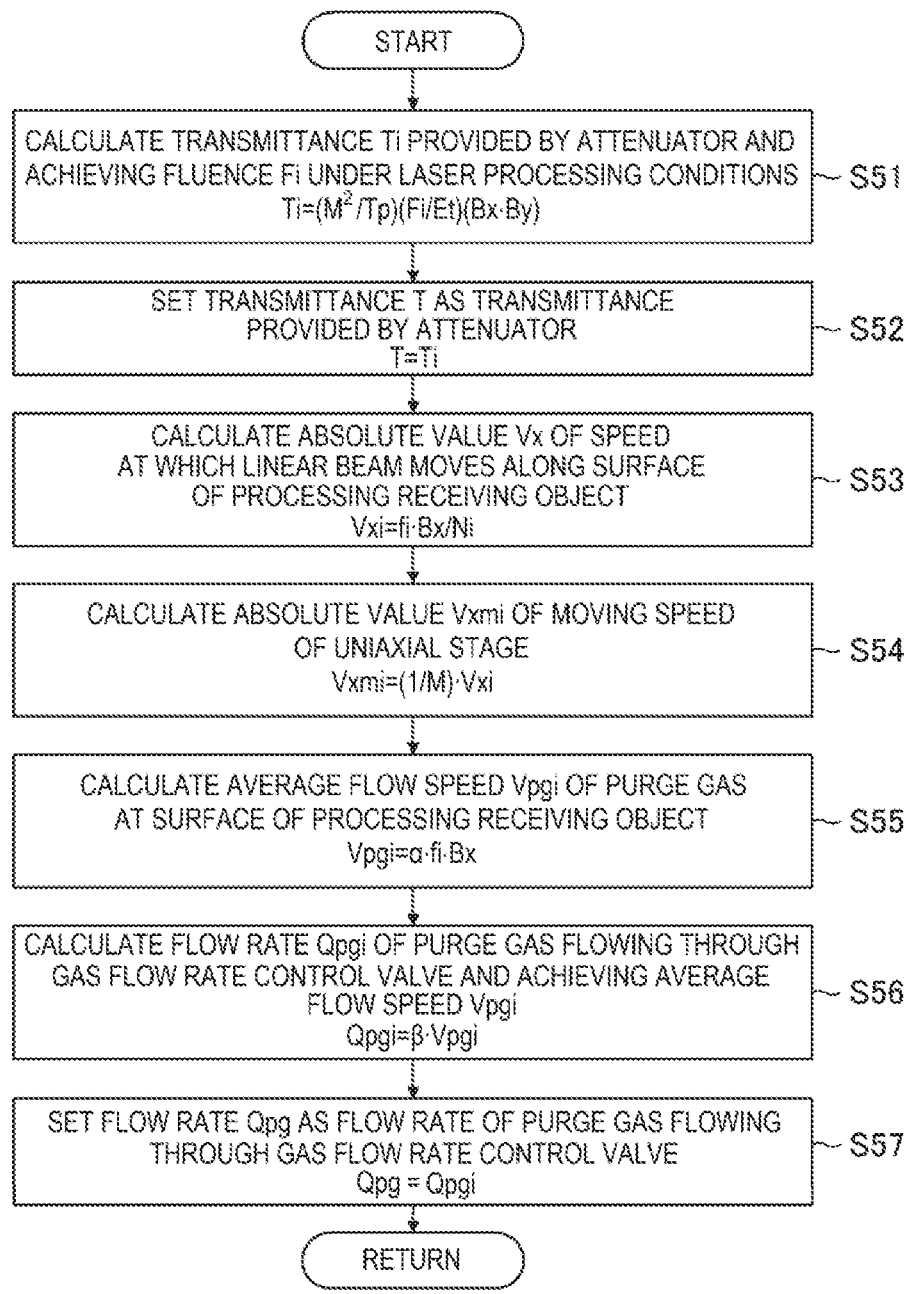
FIG. 20 is a flowchart showing an example of the content of the process of calculating and setting (2) of the control parameters used to control the laser processing apparatus.

FIG. 20 is a flowchart showing an example of the content of the process of calculating and setting (2) of the control parameters used to control the laser processing apparatus. The flowchart shown in FIG. 20 is applied to step S16A in FIG. 19. In FIG. 20, the same step as the step described with reference to the flowchart of FIG. 7 has the same step number, and no duplicated description will be made. In FIG. 20, steps S55 to S57 are provided after step S54.

In step S55, the laser processing controller 100 calculates an average flow speed Vpgi of the purge gas at the surface of the processing receiving object 160. The average flow speed Vpgi of the purge gas flowing along the surface of the processing receiving object 160 can be determined from Expression (7).

$$Vpgi = \alpha \cdot fi \cdot Bx \quad (7)$$

Reference character α in Expression (7) is a proportionality coefficient. For example, the value of α may be 1.

Expression (7) allows the average flow speed Vpgi of the purge gas at the surface of the processing receiving object 160 to be calculated on the assumption that the effect of the debris can be suppressed by moving the debris by the linear beam width Bx in the minor axis direction within the repetitive cycle (1/fi) of the pulsed laser light.

In step S56, the laser processing controller 100 calculates a flow rate Qpgi of the purge gas flowing through the gas flow rate control valve and achieving the average flow speed Vpgi. The flow rate Qpgi can be determined from Expression (8).

$$Qpgi = \beta \cdot Vpgi \quad (8)$$

Reference character β in Expression (8) is a proportionality coefficient. For example, let S be the flow passage cross-sectional area of the purge gas flowing along the surface of the processing receiving object 160, and β may be equal to S.

In step S57, the laser processing controller 100 then sets the flow rate Qpg of the purge gas flowing through the gas flow rate control valve. That is, the laser processing controller 100 is configured to set the flow rate Qpg at Qpgi determined in step S56. The laser processing controller 100 is then configured to transmit data that achieves the flow rate Qpg to the gas flow rate control valve, which controls the flow rate of the purge gas.

After step S57, the laser processing controller 100 leaves the flowchart of FIG. 20 and returns to the main procedure in FIG. 19.

Figure 21:
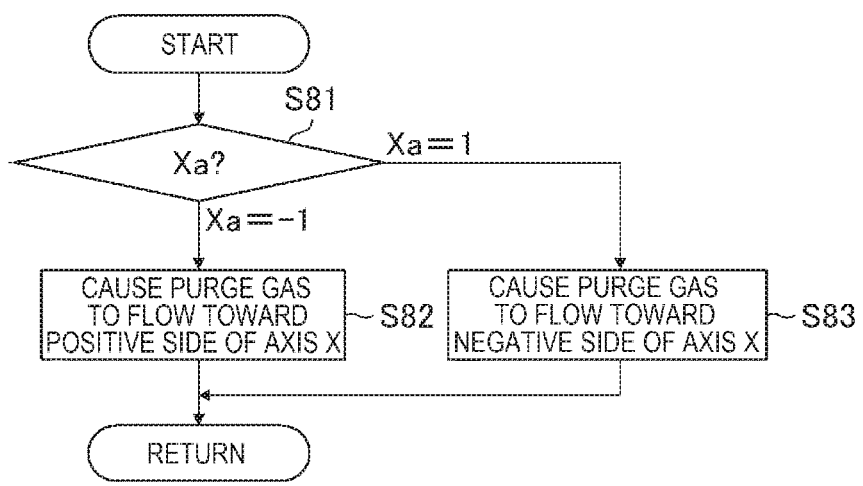
FIG. 21 is a flowchart showing an example of the process of controlling the direction of a purge gas.

FIG. 21 is a flowchart showing an example of the process of controlling the direction of the purge gas. The flowchart shown in FIG. 21 is applied to step S19 in FIG. 19. In step S81 in FIG. 21, the laser processing controller 100 checks the value of the parameter Xa and selects the process in step S82 or S83 in accordance with the value of Xa.

When Xa=−1 is satisfied in step S81, which means that the linear beam moves toward the negative side of the axis X, the purge gas is caused to flow toward the positive side of the axis X (step S82). That is, when Xa=−1 is satisfied, the laser processing controller 100 proceeds to step S82 and causes the purge gas to flow toward the positive side of the axis X. Specifically, in step S82, the laser processing controller 100 transmits control signals to the purge gas switching valve 84 and the discharge gas switching valve 94 to cause the purge gas to flow from the first purge gas nozzle 81 to the first discharge duct 91.

On the other hand, When Xa=1 is satisfied in step S81, which means that the linear beam moves toward the positive side of the axis X, the purge gas is caused to flow toward the negative side of the axis X (step S83). That is, when Xa=1 is satisfied, the laser processing controller 100 proceeds to step S83 and causes the purge gas to flow toward the negative side of the axis X. Specifically, in step S83, the laser processing controller 100 transmits control signals to the purge gas switching valve 84 and the discharge gas switching valve 94 to cause the purge gas to flow from the second purge gas nozzle 82 to the second discharge duct 92.

After step S82 or S83, the laser processing controller 100 leaves the flowchart of FIG. 21 and returns to the main procedure in FIG. 19.

The table 76 in the first embodiment is an example of the "placement base" in the present disclosure. The linear beam shaping optical system 130, the mask 140, and the projection optical system 142 form an optical system that guides the pulsed laser light outputted from the laser apparatus 12 to the processing receiving object 160 and is an example of the "optical system" in the present disclosure. The uniaxial stage 138 is an example of the "mover" and the "first mover" in the present disclosure. The purge gas is an example of the "gas" in the present disclosure. The first purge gas nozzle 81 and the second purge gas nozzle 82 are each an example of the "gas supply port" in the present disclosure. The first discharge duct 91 and the second discharge duct 92 are each an example of the "gas recovery port" in the present disclosure. The purge gas switching valve 84 is an example of the "first switching valve" in the present disclosure. The discharge gas switching valve 94 is an example of the "second switching valve" in the present disclosure. The high-reflectance mirrors 111 and 112 and the attenuator 120 are an example of the "transfer system" in the present disclosure. Another optical system configured to function as a transfer system configured to transfer the laser light may be provided between the laser apparatus 12 and the laser processing apparatus 14. The gas flow rate control valve 85 is an example of the "flow rate adjuster" in the present disclosure. The laser processing controller 100 is an example of the "controller" in the present disclosure. The direction of the X axis is an example of the "direction of a first axis" in the present disclosure. The direction of the Y axis is an example of the "direction of a second axis" in the present disclosure. The XYZ stage 74 is an example of the "second mover" in the present disclosure.

4.3 Effects and Advantages

According to the first embodiment, the debris on the surface of the processing receiving object 160 can be effectively removed, whereby the processing rate and the uniformity of the processing rate at the processing surface can be improved.

5. Second Embodiment

5.1 Configuration

The configuration of a laser processing system including a laser processing apparatus according to a second embodiment is the same as that in the first embodiment shown in FIG. 14.

5.2 Operation

In the second embodiment, the laser processing controller 100 is configured to estimate the quantity of produced debris based on the laser processing conditions and control the flow rate of the purge gas based on the result of the estimation.

Figure 22:
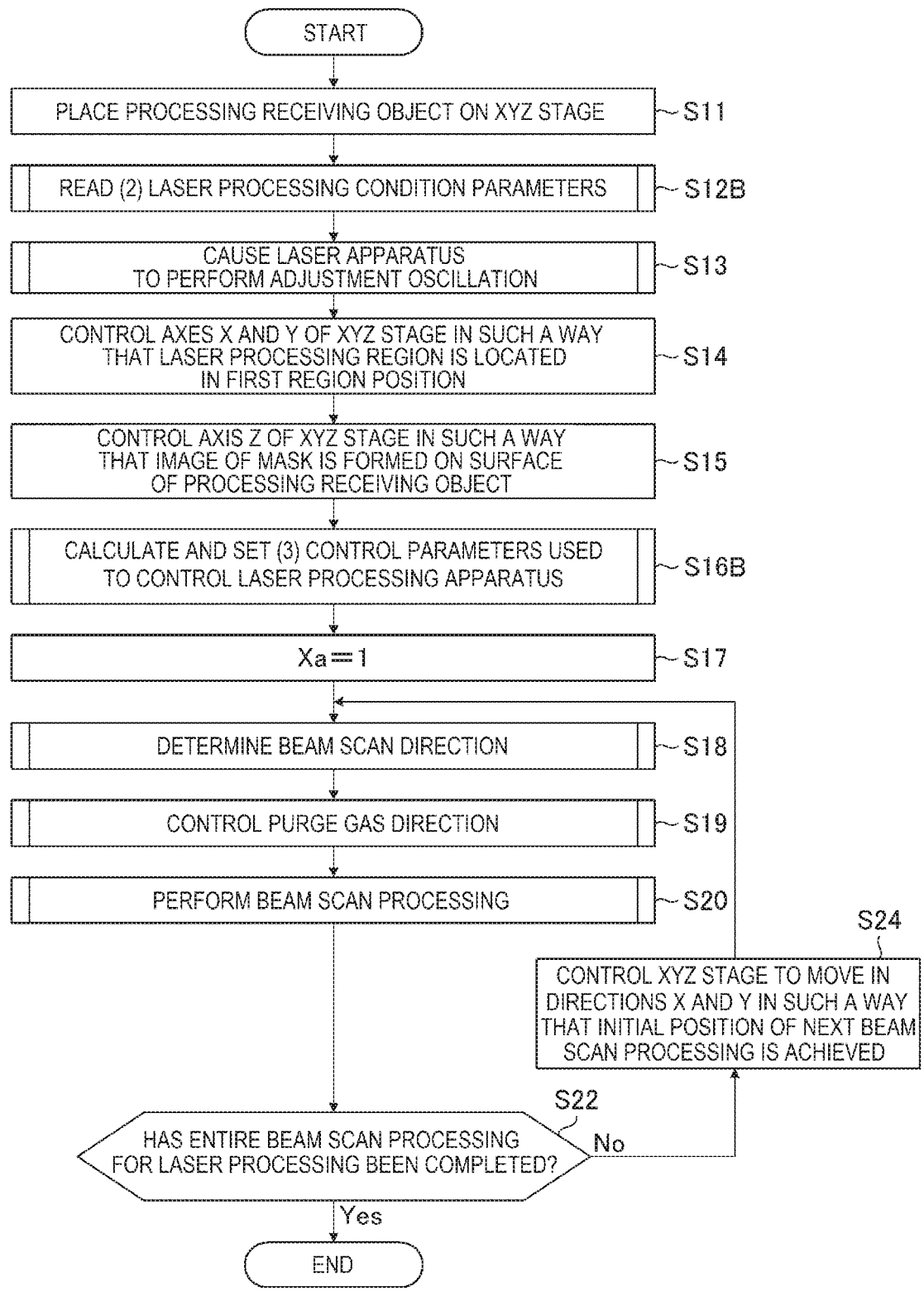
FIG. 22 is a flowchart showing an example of the control performed by a laser processing system including a laser processing apparatus according to a second embodiment.

FIG. 22 is a flowchart showing an example of the control performed by the laser processing system including the laser processing apparatus according to the second embodiment.

In FIG. 22, differences from the flowchart described with reference to FIGS. 4 and 19 will be described. The flowchart shown in FIG. 22 includes step S12B in place of step S12 in FIG. 19. Further, the flowchart shown in FIG. 22 includes step S16B in place of step S16A in FIG. 19.

In step S12B in FIG. 22, the laser processing controller 100 reads the laser processing condition parameters.

Figure 23:
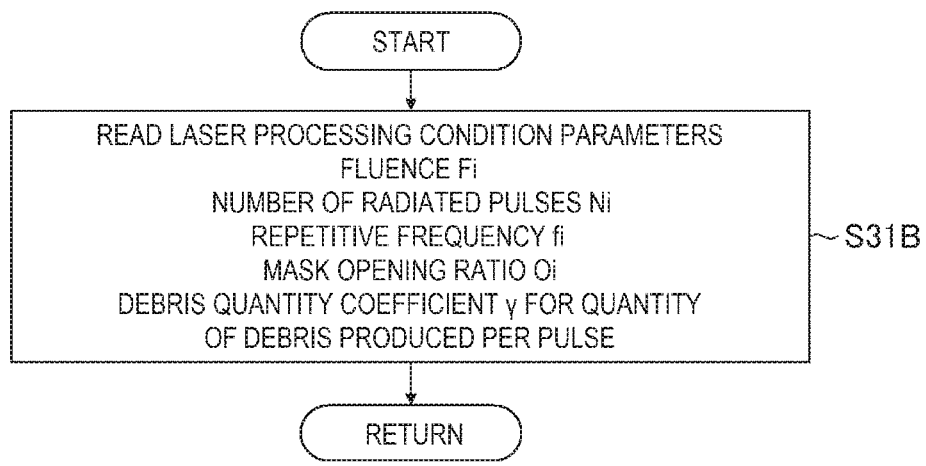
FIG. 23 is a flowchart showing an example of the content of the process of reading (2) the laser processing condition parameters.

FIG. 23 is a flowchart showing an example of the content of the process of reading (2) the laser processing condition parameters. The flowchart shown in FIG. 23 is applied to step S12B in FIG. 22.

In step S31B in FIG. 23, in addition to the fluence Fi, the number of radiated pulses Ni, and the repetitive frequency fi described in step S12 in FIG. 4, an opening ratio Oi of the mask 140 and a debris quantity coefficient γ representing the quantity of the debris produced per pulse are further read.

The quantity of the produced debris increases in proportion to the opening ratio Oi of the mask 140. Further, the quantity of the debris produced per pulse changes in accordance with the absorptance of the processing receiving object 160 and the fluence Fi. The debris quantity coefficient γ is a coefficient by which a reference quantity of the produced debris is multiplied. For example, assuming that a polyimide material is a reference material, and that the depth processed per pulse at reference fluence is PI [μm/pulse], the debris quantity coefficient γ can be determined based on Expression (9) below by determining a depth D processed per pulse [μm/pulse] at the fluence Fi in a preparatory test.

$$\gamma = D/PI \qquad (9)$$

After step S31B, the laser processing controller 100 returns to the main procedure in FIG. 22.

The laser processing conditions read in step S31B in FIG. 23 are an example of the "processing condition" in the present disclosure.

Figure 24:
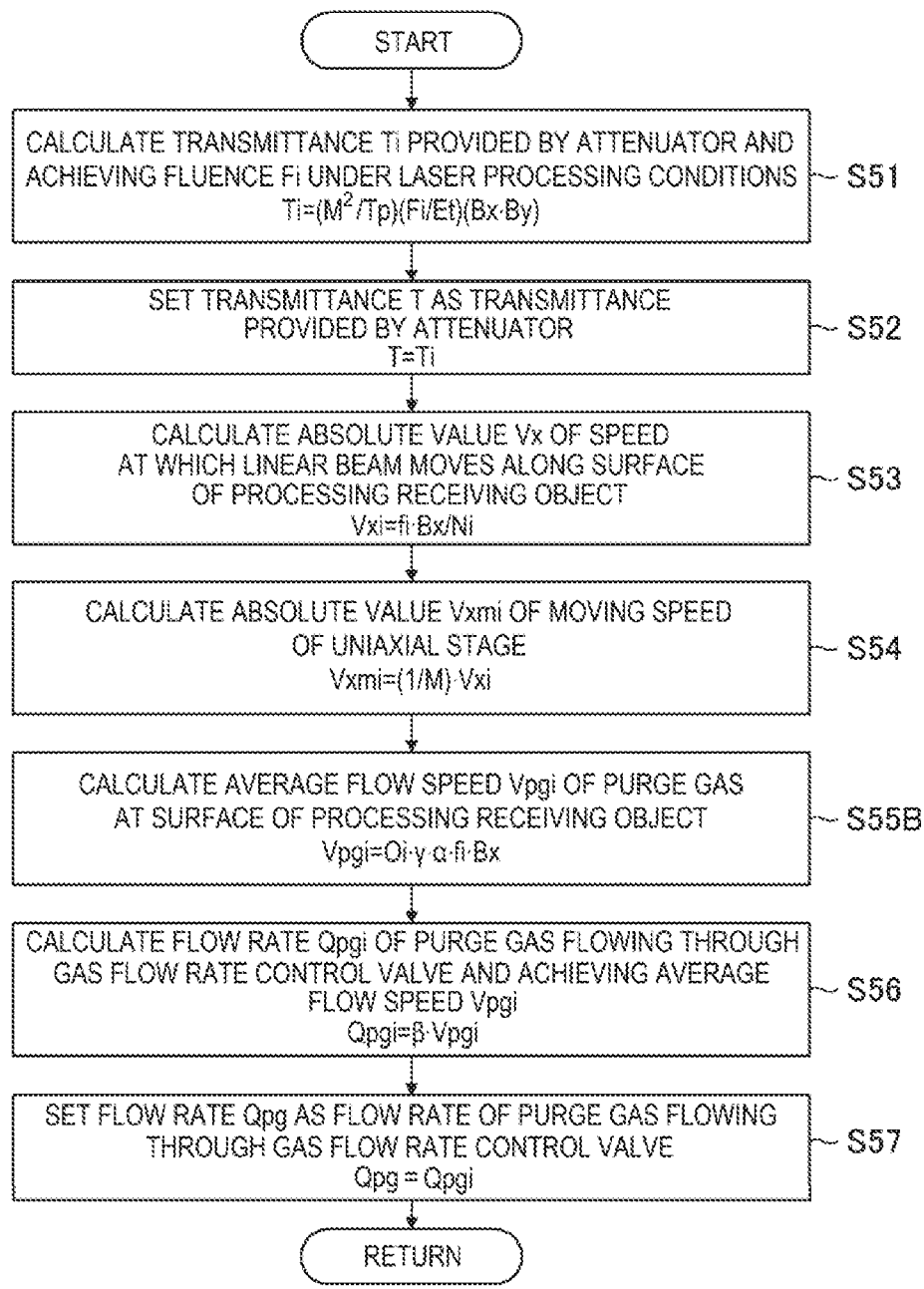
FIG. 24 is a flowchart showing an example of the content of the process of calculating and setting (3) of the control parameters used to control the laser processing apparatus.

FIG. 24 is a flowchart showing an example of the content of the process of calculating and setting (3) of the control parameters of the laser processing apparatus. The flowchart shown in FIG. 24 is applied to step S16B in FIG. 22.

In FIG. 24, the same step as the step described with reference to the flowchart of FIGS. 7 and 20 has the same step number, and no duplicated description will be made. The flowchart shown in FIG. 24 includes step S55B in place of step S55 in the flowchart of FIG. 20.

In step S55B, the laser processing controller 100 calculates the average flow speed Vpgi of the purge gas at the surface of the processing receiving object 160 based on Expression (10) below.

$$Vpgi = Oi \cdot \gamma \cdot \alpha \cdot fi \cdot Bx \tag{10}$$

The quantity of the produced debris per pulse is proportional to each of the opening ratio Oi of the mask 140 and the debris quantity coefficient γ representing the amount of abrasion that occurs per pulse.

The average flow speed Vpgi of the purge gas at the surface of the processing receiving object 160 is therefore expressed by Expression (10) using the parameters described above.

The opening ratio Oi of the mask 140 and the debris quantity coefficient γ representing the quantity of the debris produced per pulse are each an example of information that allows estimation of the quantity of the debris produced by the processing. The laser processing controller 100 may be configured to hold data on the calculation formula expressed by Expression (10) or may be configured to hold table data that provides a computation result corresponding to Expression (10). The laser processing controller 100 may instead be configured to hold data on a calculation formula configured to calculate the quantity of the produced debris based on the laser processing conditions. The laser processing controller 100 may still instead be configured to estimate the quantity of the produced debris by using table data configured to relate the laser processing conditions to the quantity of the produced debris.

After step S55B, the laser processing controller 100 proceeds to step S56. Step S56 and the following steps are the same as those in the flowchart of FIG. 20.

5.3 Effects and Advantages

According to the second embodiment, the flow rate of the purge gas can be optimized in addition to the effects provided by the first embodiment, whereby the consumption of the purge gas can be reduced.

6. Variations of Debris Collection System that Causes Purge Gas to Flow

6.1 Variation 1

6.1.1 Configuration

Figure 25:
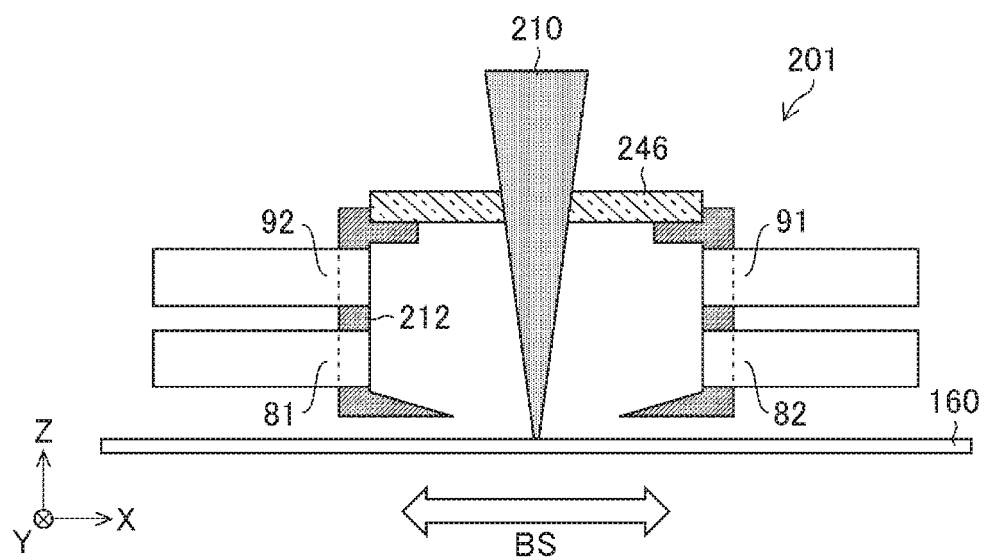
FIG. 25 is a key part cross-sectional view schematically showing the configuration of Variation 1 of a debris collection system that removes debris.
Figure 26:
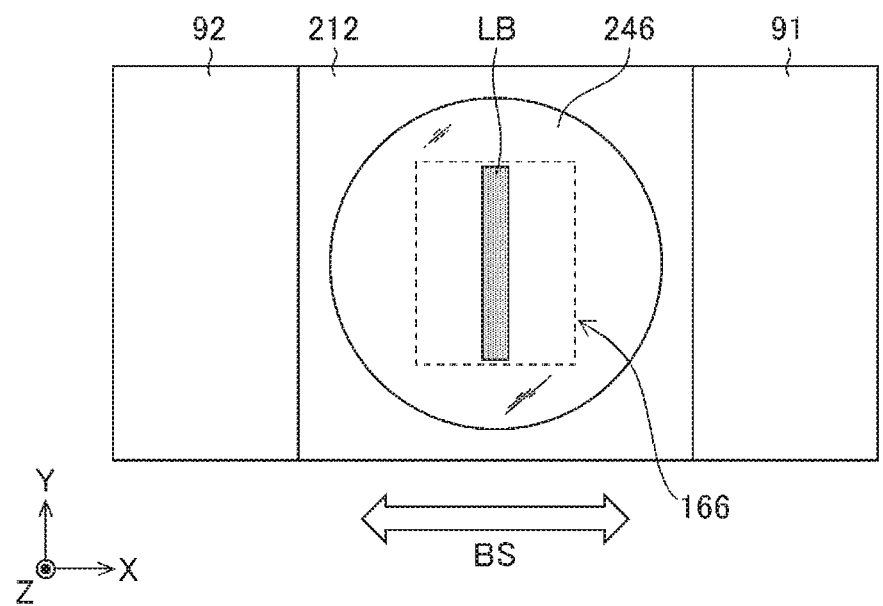
FIG. 26 is a plan view of the configuration shown in FIG. 25.

FIG. 25 is a key part cross-sectional view schematically showing the configuration of Variation 1 of the debris collection system that removes debris. FIG. 26 is a plan view of the configuration shown in FIG. 25.

A debris collection unit 201 shown in FIG. 25 may be employed in place of the form described with reference to FIG. 14, in which the first purge gas nozzle 81, the second purge gas nozzle 82, the first discharge duct 91, and the second discharge duct 92 are disposed. In FIG. 25, an element corresponding to an element in the configuration shown in FIG. 14 has the same reference character. Differences from the configuration shown in FIG. 14 will be described.

The debris collection unit 201 shown in FIG. 25 includes a cover 212, which surrounds the periphery of a region of the processing receiving object 160 that is the region irradiated with the laser light, a protective window 246, the first purge gas nozzle 81, the second purge gas nozzle 82, the first discharge duct 91, and the second discharge duct 92. The space surrounded by the cover 212 is the space to which the purge gas is supplied.

The first purge gas nozzle 81, the second purge gas nozzle 82, the first discharge duct 91, and the second discharge duct 92 are attached to the wall surface of the cover 212. That is, the first purge gas nozzle 81 and the second purge gas nozzle 82 are attached to the wall surface of the cover 212 in positions facing each other. The first discharge duct 91 and the second discharge duct 92 are also attached to the wall surface of the cover 212 in positions facing each other.

The open arrow BS pointing at opposite sides represents the direction in which the region irradiated with the linear beam is moved by the beam scanning. The beam scanning in the processing of the receiving object 160 using the linear beam scan scheme is performed toward the positive side of the axis X in one case and the negative side of the axis X in the other case, as described with reference to FIG. 3.

The protective window 246 is so disposed as to close an upper opening of the cover 212. The window 146 attached to the enclosure 150 of the radiation optical system 70 may also serve as the protective window 246.

The combination of the purge gas supply port and the purge gas sucking port for discharge purposes can be switched from one to the other in accordance with the scan direction of the linear beam LB. That is, a first form in which the first purge gas nozzle 81 and the first discharge duct 91 are used to cause the purge gas to flow and a second form in which the second purge gas nozzle 82 and the second discharge duct 92 are used to cause the purge gas to flow can be switched from one to the other in accordance with the scan direction of the linear beam LB.

In FIG. 26, the range drawn in the form of the broken line rectangle represents a region 166 of the processing receiving object 160, which is the region over which the linear beam LB moves and which is therefore irradiated with the laser light. The region 166, which is irradiated with the laser light, may be part or entirety of the processing target region.

6.1.2 Operation

The processing receiving object 160 is irradiated with laser light 210 having passed through the protective window 246. When the processing receiving object 160 is processed with the laser light 210 moved, the purge gas is sprayed via the purge gas nozzle on the front side of the beam scan direction, and the debris is removed via the discharge duct on the opposite side.

When the beam scan direction is opposite the direction described above, the same action is performed with the purge gas supplying and discharging directions reversed.

The switching control of the direction of the purge gas flow in accordance with the beam scan direction is the same as the switching control in the first or second embodiment.

6.1.3 Effects and Advantages

The configuration shown in Variation 1 provides the same effects and advantages as those provided in the first and second embodiments. Further, the configuration shown in Variation 1, in which the cover 212 surrounds the periphery of the space to which the purge gas is supplied, allows suppression of the range over which the debris diffuses, whereby the debris can be efficiently removed.

6.2 Variation 2

6.2.1 Configuration

Figure 27:
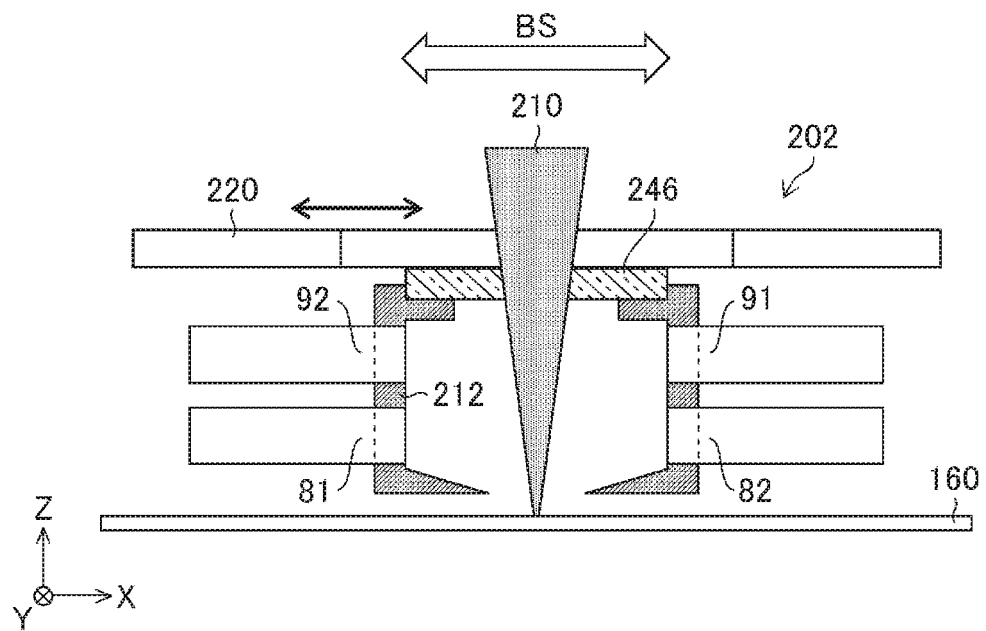
FIG. 27 is a key part cross-sectional view schematically showing the configuration of Variation 2 of the debris collection system that removes debris.
Figure 28:
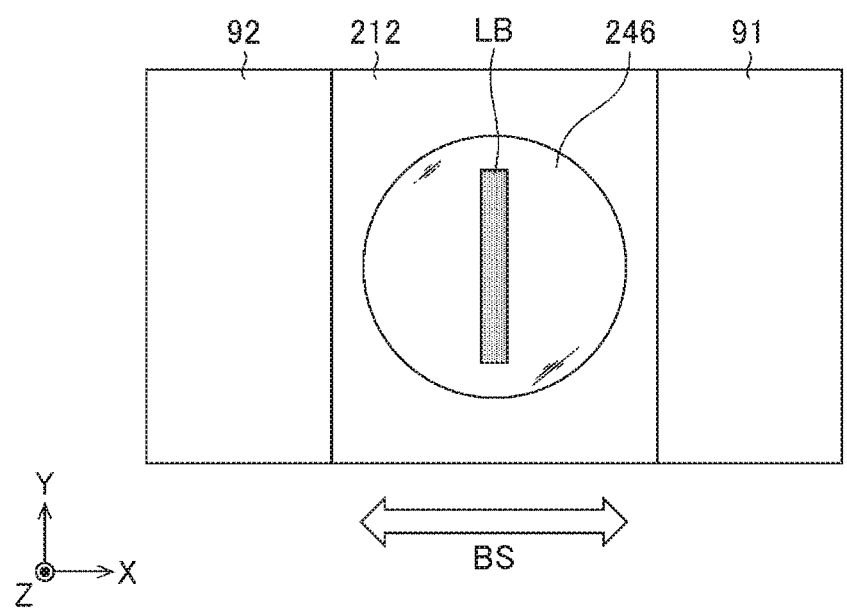
FIG. 28 is a plan view of the configuration shown in FIG. 27.

FIG. 27 is a key part cross-sectional view schematically showing the configuration of Variation 2 of the debris collection system that removes debris. FIG. 28 is a plan view of the configuration shown in FIG. 27. In the configuration shown in FIGS. 27 and 28, the same element as an element in the configuration shown in FIGS. 25 and 26 has the same reference character, and no duplicated description will be made.

A debris collection unit 202 shown in FIG. 27 includes a uniaxial stage 220, which is configured to move the cover 212 when the laser light 210 moves in the scan action. The uniaxial stage 220 may be fixed, for example, to the enclosure 150 of the radiation optical system 70 shown in FIG. 14. The cover 212 is fixed to the uniaxial stage 220. The uniaxial stage 220 is controlled by the laser processing controller 100. In FIG. 28, the uniaxial stage 220 is omitted.

6.2.2. Operation

In Variation 2 shown in FIGS. 27 and 28, the control in which the direction of the purge gas flow is switched from one to the other in accordance with the beam scan direction is the same as the control performed in Variation 1.

Further, in Variation 2, the uniaxial stage 220 is so controlled by following the motion of the beam scanning that the distance between the beam of the laser light 210 and the purge gas supply port is fixed to move the cover 212 in the same direction as the direction in which the beam scanning is performed.

When the beam scanning is performed toward the negative side of the axis X, the cover 212 is moved along with the first purge gas nozzle 81 and the first discharge duct 91 toward the negative side of the axis X at the speed equal to the beam scan speed.

When the beam scanning is performed toward the positive side of the axis X, the cover 212 is moved along with the second purge gas nozzle 82 and the second discharge duct 92 toward the positive side of the axis X at the speed equal to the beam scan speed.

The solid arrow pointing at opposite sides shown in FIG. 27 represents that the debris collection unit 202 including the cover 212 is moved rightward and leftward in FIG. 27 by following the beam scanning.

The uniaxial stage 220 is an example of the "third mover" in the present disclosure.

6.2.3 Effects and Advantages

The configuration shown in Variation 2 not only provides the same effects and advantages as those provided by Variation 1 but can stabilize the purge gas flow speed because the distance between the beam and the purge gas supply port is fixed for more efficient removal of the debris.

Further, Variation 2 allows reduction in size of the unit including the cover 212 as compared with Variation 1.

6.3 Variation 3

6.3.1 Configuration

Figure 29:
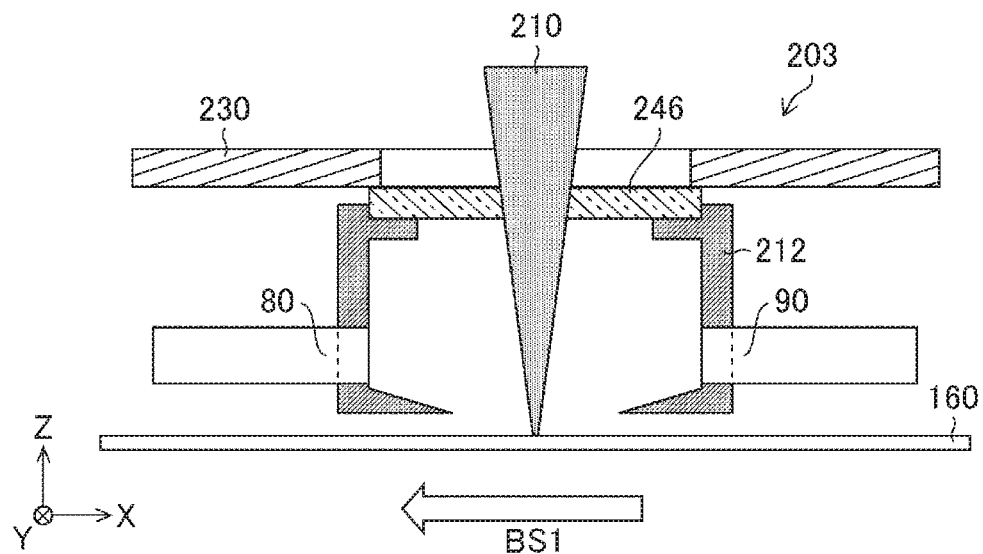
FIG. 29 is a key part cross-sectional view schematically showing the configuration of Variation 3 of the debris collection system that removes debris.
Figure 30:
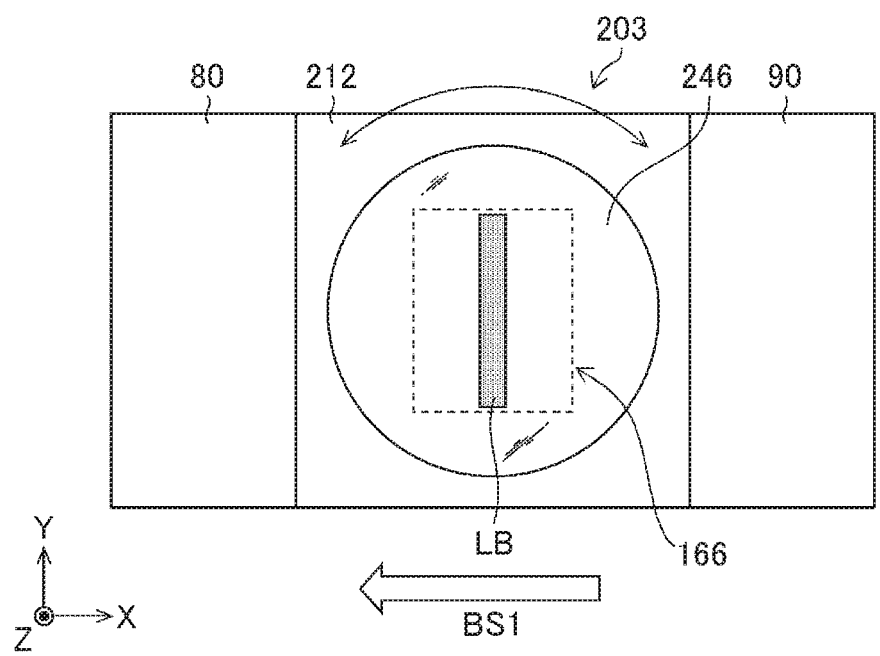
FIG. 30 is a plan view of the configuration shown in FIG. 29.

FIG. 29 is a key part cross-sectional view schematically showing the configuration of Variation 3 of the debris collection system that removes debris. FIG. 30 is a plan view of the configuration shown in FIG. 29. In the configuration shown in FIGS. 29 and 30, the same element as an element in the configuration shown in FIGS. 25 and 26 has the same reference character, and no duplicated description will be made. Differences from Variation 1 shown in FIGS. 25 and 26 will be described.

A debris collection unit 203 shown in FIG. 29 has only one set of purge gas supply and recovery ports, and a rotary stage 230 is configured to allow swapping the positions where the supply port and the recovery port are disposed.

That is, the debris collection unit 203 includes only the purge gas nozzle 80 as the purge gas supply port and only the discharge duct 90 as the recovery port for discharge purposes. The purge gas nozzle 80 and the discharge duct 90 are attached to the wall surface of the cover 212 in positions facing each other. The debris collection unit 203 further includes the rotary stage 230, which is configured to rotate the cover 212 including the purge gas nozzle 80 and the discharge duct 90.

The rotary stage 230 may be fixed, for example, to the enclosure 150 of the radiation optical system 70 shown in FIG. 14. The cover 212 is fixed to the rotary stage 230. The rotary stage 230 is controlled by the laser processing controller 100. In FIG. 30, the rotary stage 230 is omitted.

The rotary stage 230 is rotated in accordance with the beam scan direction in which the linear beam LB is moved to swap the positions where the purge gas nozzle 80 and the discharge duct 90 are disposed to switch the direction of the purge gas flow.

In the configuration of Variation 3, the purge gas switching valve 84 and the discharge gas switching valve 94 described with reference to FIG. 14 can be omitted. That is, when Variation 3 is employed, the configuration shown in FIG. 1 can be employed as the structure of the pipes through which the purge gas is supplied and discharged.

6.3.2 Operation

The open arrow BS1 shown in FIG. 29 represents the direction in which the region irradiated with the linear beam is moved by the beam scanning. When the processing receiving object 160 is processed with the laser light 210 moving toward the negative side of the axis X, the purge gas is sprayed via the purge gas nozzle 80 disposed on the front side of the scan direction of the linear beam LB, and the debris is removed via the discharge duct 90 on the opposite side, as shown in FIG. 29.

When the beam scan direction is reversed, the rotary stage 230 is rotated to swap the positions where the purge gas nozzle 80 and the discharge duct 90 are disposed.

Figure 31:
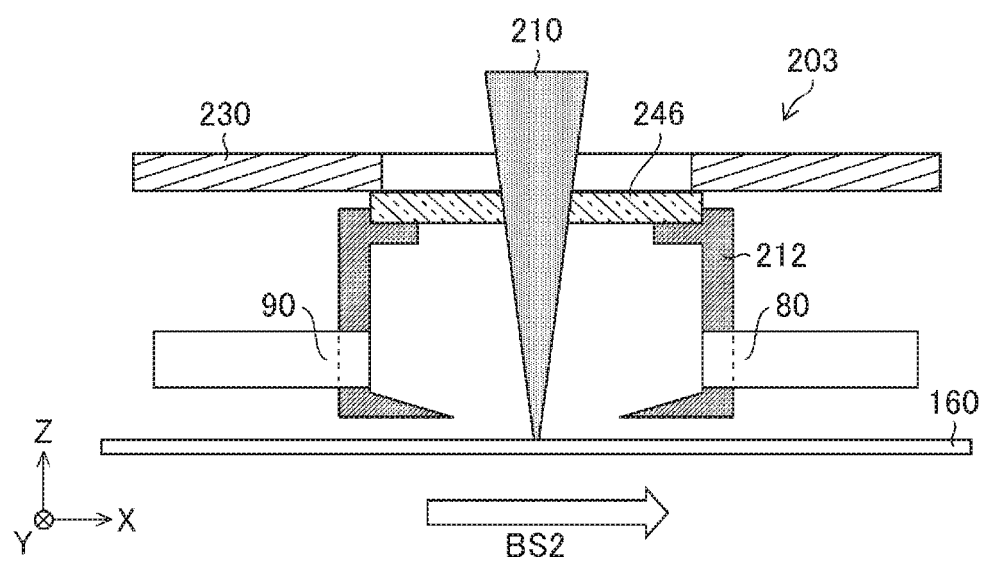
FIG. 31 is a cross-sectional view showing a case where the beam scan direction in FIG. 29 is reversed.
Figure 32:
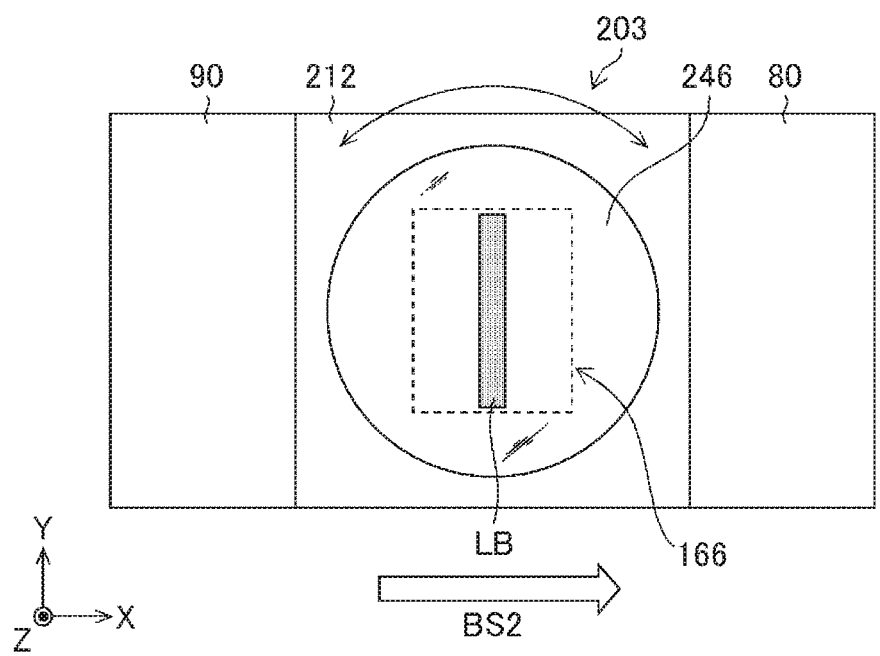
FIG. 32 is a plan view of the configuration shown in FIG. 31.

FIGS. 31 and 32 show the case where the beam scanning is performed toward the positive side of the axis X. FIG. 31 is a cross-sectional view, and FIG. 32 is a plan view. The open arrow BS2 shown in FIG. 31 represents the direction in which the region irradiated with the linear beam is moved by the beam scanning. In FIG. 31, the purge gas nozzle 80 is disposed on the right of the region irradiated with the linear beam LB, and the discharge duct 90 is disposed on the left of the region irradiated with the linear beam LB.

When the processing receiving object 160 is processed with the laser light 210 moving toward the positive side of the axis X, the purge gas is sprayed via the purge gas nozzle 80 disposed on the front side of the scan direction of the linear beam LB, and the debris is removed via the discharge duct 90 on the opposite side, as shown in FIGS. 31 and 32.

The rotary stage 230 is an example of the "rotator" in the present disclosure. The purge gas nozzle 80 is an example of the "gas supply port" in the present disclosure. The discharge duct 90 is an example of the "gas recovery port" in the present disclosure.

6.3.3. Effects and Advantages

The configuration shown in Variation 3 provides the same effects as those provided by Variation 1. The configuration shown in Variation 3 further allows simplification of the structure of the pipes through which the purge gas is supplied and discharged as compared with Variation 1.

6.4 Variation 4

6.4.1 Configuration

Figure 33:
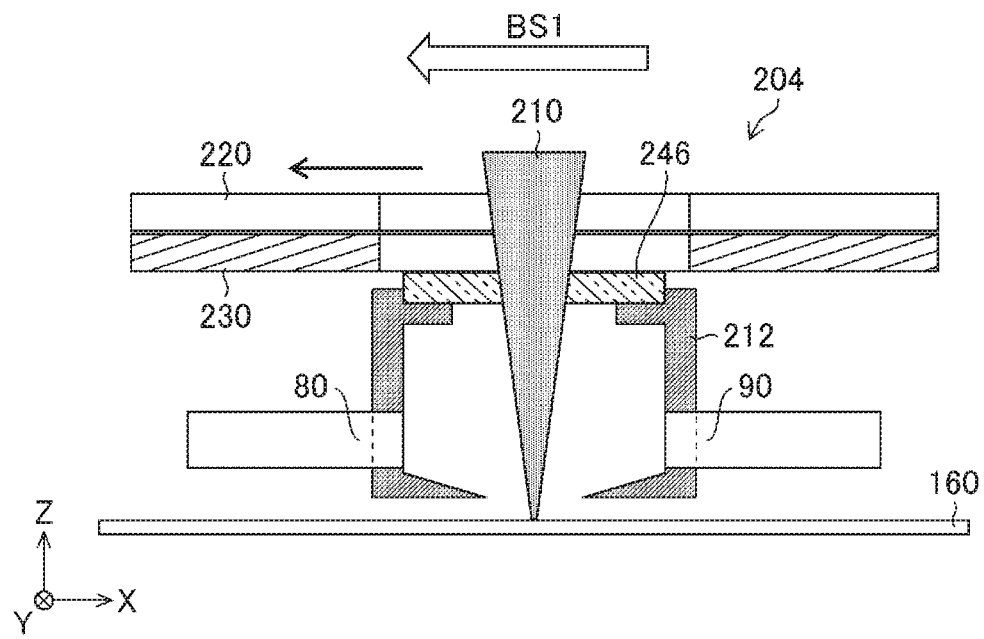
FIG. 33 is a key part cross-sectional view schematically showing the configuration of Variation 4 of the debris collection system that removes debris.
Figure 34:
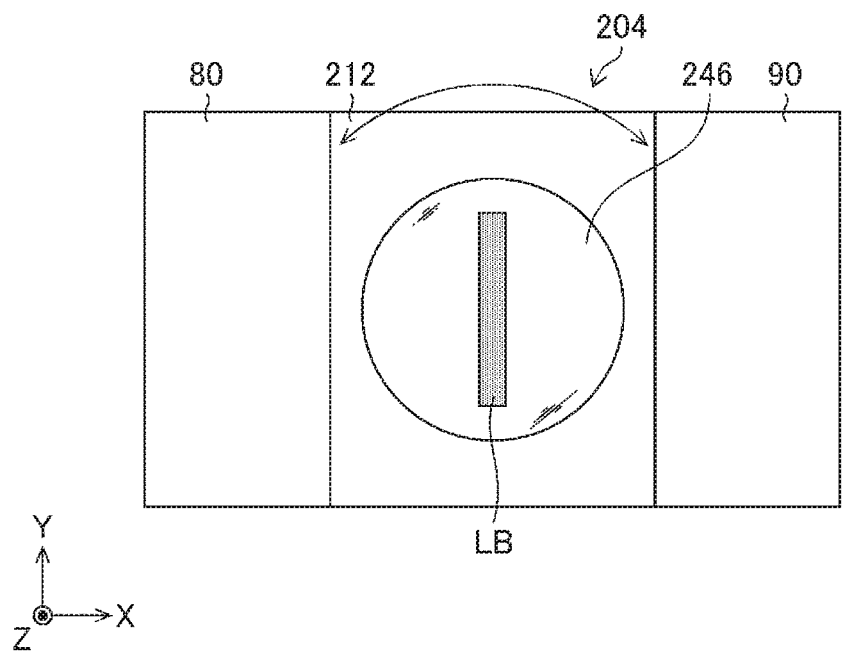
FIG. 34 is a plan view of the configuration shown in FIG. 33.

FIG. 33 is a key part cross-sectional view schematically showing the configuration of Variation 4 of the debris collection system that removes debris. FIG. 34 is a plan view of the configuration shown in FIG. 33. In the configuration shown in FIGS. 33 and 34, the same element as an element in the configuration shown in FIGS. 25 to 32 has the same reference character, and no duplicated description will be made. Differences from Variation 3 shown in FIGS. 31 and 32 will be described.

A debris collection unit 204 shown in FIG. 33 has a form in which the uniaxial stage 220 in Variation 2 is combined with Variation 3. The debris collection unit 204 shown in FIG. 33 includes the uniaxial stage 220 configured to move the rotary stage 230 and the cover 212 integrated with each other when the laser light 210 moves in the scan action. The debris collection unit 204 includes only the purge gas nozzle 80 as the purge gas supply port and only the discharge duct 90 as the recovery port for discharge purposes, as in Variation 3.

In FIG. 34, the uniaxial stage 220 and the rotary stage 230 are omitted.

6.4.2 Operation

When the processing receiving object 160 is processed with the laser light 210 moving toward the negative side of the axis X, the purge gas is sprayed via the purge gas nozzle 80 disposed on the front side of the scan direction of the linear beam LB, and the debris is removed via the discharge duct 90 on the opposite side, as shown in FIG. 33.

Further, in Variation 4, the uniaxial stage 220 is so controlled by following the motion of the beam scanning that the distance between the beam of the laser light 210 and the purge gas supply port is fixed to move the cover 212 in the same direction as the direction in which the beam scanning is performed.

The solid arrow shown in FIG. 33 represents that the debris collection unit 204 including the cover 212 is moved rightward in FIG. 33 by following the beam scanning.

When the beam scan direction is reversed, the rotary stage 230 is rotated to swap the positions where the purge gas nozzle 80 and the discharge duct 90 are disposed.

Figure 35:
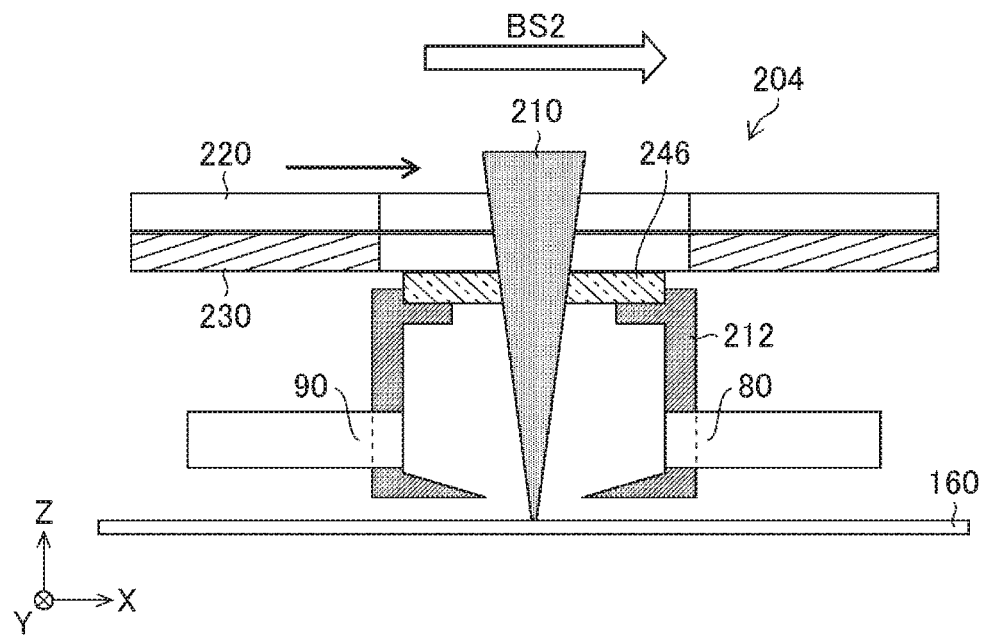
FIG. 35 is a cross-sectional view showing a case where the beam scan direction in FIG. 33 is reversed.
Figure 36:
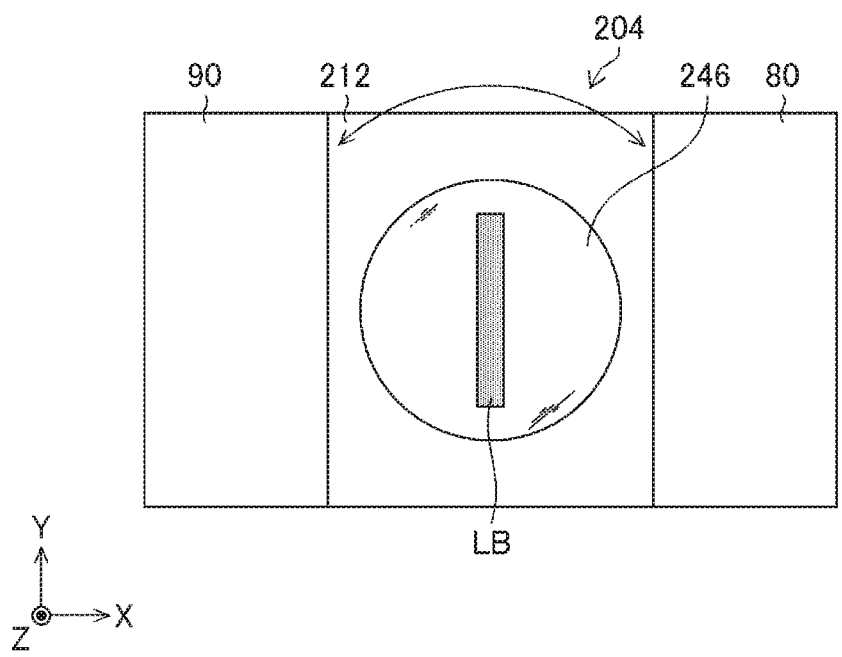
FIG. 36 is a plan view of the configuration shown in FIG. 35.

FIGS. 35 and 36 show the case where the beam scanning is performed toward the positive side of the axis X. FIG. 35 is a cross-sectional view, and FIG. 36 is a plan view. In FIG. 35, the purge gas nozzle 80 is disposed on the right of the region irradiated with the linear beam LB, and the discharge duct 90 is disposed on the left of the region irradiated with the linear beam LB.

When the processing receiving object 160 is processed with the laser light 210 moving toward the positive side of the axis X, the purge gas is sprayed via the purge gas nozzle 80 disposed on the front side of the scan direction of the linear beam LB, and the debris is removed via the discharge duct 90 on the opposite side, as shown in FIGS. 35 and 36. The cover 212 is so moved by following the motion of the beam scanning that the distance between the beam and the purge gas supply port is fixed. The solid arrow shown in FIG. 35 represents that the debris collection unit 204 including the cover 212 is moved rightward in FIG. 35 by following the beam scanning.

6.4.3 Effects and Advantages

The configuration shown in Variation 4 not only provides the same effects and advantages as those provided by Variation 3 but can stabilize the purge gas flow speed because the distance between the beam and the purge gas supply port is fixed for more efficient removal of the debris.

7. Example of Fly-Eye Lens

7.1 Configuration

Figure 37:
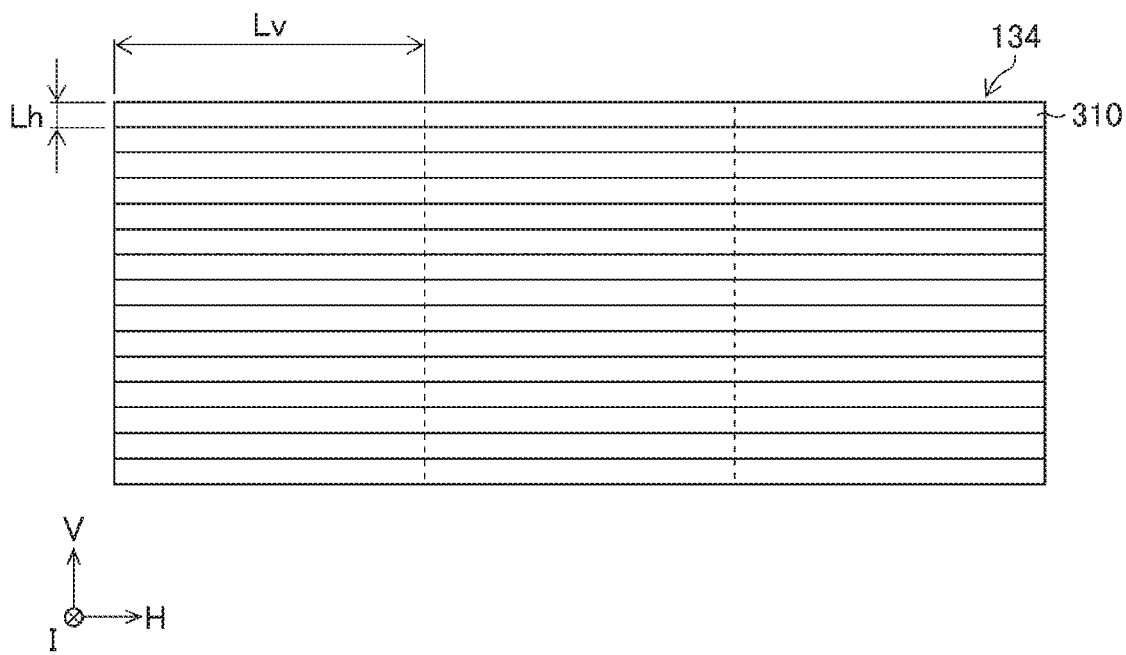
FIG. 37 is a front view showing an example of the configuration of a fly-eye lens.
Figure 38:
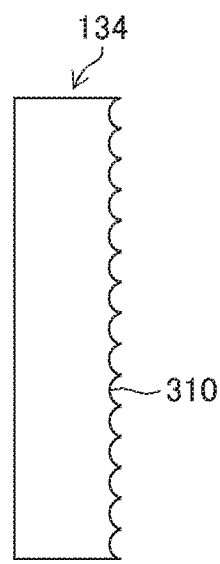
FIG. 38 is a side view of the fly-eye lens shown in FIG. 37.
Figure 39:
FIG. 39 is a top view of the fly-eye lens shown in FIG. 37.

FIGS. 37 to 39 schematically show an example of the configuration of the fly-eye lens used in the linear beam shaping optical system. FIG. 37 is a front view, FIG. 38 is a side view, and FIG. 39 is a top view.

The fly-eye lens 134 is made of a material configured to transmit the pulsed laser light outputted from the laser apparatus 12 at high transmittance. For example, synthetic quartz and CaF2 crystal can be used as a preferable material of the fly-eye lens 134.

In the following description, directions I, H, and V are defined as follows: The direction I is the direction in which the laser beam travels. The direction V is the vertical direction of the laser beam. The direction H is the horizontal direction of the laser beam.

Concave cylindrical surfaces 310, which each extend along the direction H, are arranged in a row on a first surface of the fly-eye lens 134 at intervals Lh in the direction V.

Concave cylindrical surfaces 312, which each extend along the direction V, are arranged in a row on a second surface of the fly-eye lens 134 at intervals Lv in the direction H.

The radii of curvature of the cylindrical surfaces 310 and 312 may be so configured that the focal points thereof substantially coincide with each other.

The interval Lh between the cylindrical surfaces 310, which are each formed around an axis extending in the direction H, is smaller than the interval Lv between the cylindrical surfaces 312, which are each formed around an axis extending in the direction V.

7.2 Operation

When the pulsed laser light passes through the fly-eye lens 134, secondary light sources are produced in the positions of the focal points of the cylindrical surfaces 310 and 312. The condenser lens 136 is configured to achieve Koehler illumination having an oblong shape in the position of the focal point of the condenser lens 136. The shape of the region that receives the Koehler illumination is similar to the shape of each of the lenses that form the fly-eye lens 134 and each have a dimension of Lv×Lh.

7.3 Others

In the example shown in FIGS. 37 to 39, the fly-eye lens 134 is produced by processing a substrate configured to transmit the pulsed laser light to have concave cylindrical surfaces, but not necessarily, and cylindrical convex lenses may be attached to the substrate.

The substrate may be so processed as to form a Fresnel lens that functions in the same manner as the fly-eye lens 134 shown in FIGS. 37 to 39.

In the embodiments and variations described above, the configuration in which the processing receiving object 160 is processed by using the linear beam, and the laser light with which the processing receiving object 160 is irradiated may have a shape other than the shape of the linear beam. For example, the laser light may have a square beam shape. To form a square radiated beam, the intervals between the cylindrical surfaces 310 and 312 may be so set that Lv=Lh is satisfied.

8. Specific Example of Laser Processing Conditions

FIG. 40 shows specific examples of the laser processing conditions. The numerals of the parameters shown in FIG. 40 are presented only by way of example and changed as appropriate in accordance with the material of the processing receiving object 160 and the purpose for which the processing receiving object 160 is processed.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A laser processing apparatus comprising:
   a placement base on which a processing receiving object is placed;
   an optical system configured to guide laser light to the processing receiving object placed on the placement base;
   a gas supply port via which a gas is supplied to a periphery of an irradiated region of the processing receiving object that is a region irradiated with the laser light;
   a gas recovery port via which the gas supplied via the gas supply port is recovered;
   a mover configured to move the irradiated region of the processing receiving object;
   a controller configured to control, in accordance with a direction in which the irradiated region is moved, a direction of a gas flow of the gas caused to flow from the gas supply port to the gas recovery port, the controller being configured to change the direction of the gas flow in response to a change in the direction in which the mover moves the irradiated region in such a way that the gas flows in a direction opposite the direction in which the irradiated region is move;
   a cover configured to surround a space to which the gas is supplied via the gas supply port, the gas supply port and the gas recovery port being disposed at the cover; and
   a rotator configured to rotate the cover in accordance with the direction in which the irradiated region is moved.

2. The laser processing apparatus according to claim 1, further comprising:
   a plurality of the gas supply ports; and
   a plurality of the gas recovery ports,
   wherein the controller is configured to change the direction of the gas flow by changing a combination of the gas supply port via which the gas is sprayed and the gas recovery port via which the gas is recovered, the gas supply port and the gas recovery port selected from the plurality of the gas supply ports and the plurality of the gas recovery ports, in accordance with the direction in which the irradiated region is moved.

3. The laser processing apparatus according to claim 2, further comprising:
   a first switching valve configured to switch, out of the plurality of the gas supply ports, the gas supply port via which the gas is sprayed to the gas supply port via which the gas is not sprayed and vice versa; and
   a second switching valve configured to switch, out of the plurality of the gas recovery ports, the gas recovery port via which the gas is recovered to the gas recovery port via which the gas is not recovered and vice versa,
   wherein the controller is configured to control the first switching valve and the second switching valve in accordance with the direction in which the irradiated region is moved.

4. The laser processing apparatus according to claim 1, further comprising
   a rotator configured to swap positions where the gas supply port and the gas recovery port are disposed,
   wherein the controller is configured to change the direction of the gas flow by rotating the rotator in accordance with the direction in which the irradiated region is moved.

5. The laser processing apparatus according to claim 1, further comprising
   a discharger connected to the gas recovery port.

6. The laser processing apparatus according to claim 1, wherein the optical system includes
a linear beam shaping optical system configured to produce a linear beam having an oblong beam shape,
a mask with which the linear beam is irradiated, and
a projection optical system configured to project an image of the mask on a surface of the processing receiving object.

7. The laser processing apparatus according to claim 6, wherein the mover includes a uniaxial stage configured to cause the linear beam shaping optical system to make reciprocal motion in a direction of a first axis.

8. The laser processing apparatus according to claim 6, wherein a first mover configured to move the laser light in a direction of a first axis that is a direction of a minor axis of the linear beam is employed as the mover,
the laser processing apparatus further comprises a second mover configured to move the processing receiving object in the direction of the first axis and a direction of a second axis that is a direction of a major axis of the linear beam, and
the controller is configured to control the first mover and the second mover.

9. The laser processing apparatus according to claim 8, wherein the controller is configured to alternately perform control in which the second mover is activated to change a processing target region of the processing receiving object and control in which the processing target region is processed with the first mover activated to move the irradiated region of the processing receiving object.

10. The laser processing apparatus according to claim 1, further comprising
a flow rate adjuster configured to adjust a flow rate of the gas sprayed via the gas supply port,
wherein the controller is configured to control the flow rate adjuster based on a processing condition and information that allows estimation of a quantity of debris produced when the processing receiving object is irradiated with the laser light.

11. The laser processing apparatus according to claim 10, wherein the information that allows estimation of the quantity of debris contains data on a calculation formula configured to calculate the quantity of debris based on the processing condition.

12. The laser processing apparatus according to claim 10, wherein the information that allows estimation of the quantity of debris contains table data configured to relate the processing condition to the quantity of debris.

13. The laser processing apparatus according to claim 10, wherein the processing condition includes an opening ratio of a mask.

14. The laser processing apparatus according to claim 1, wherein the mover is configured to move at least part of the optical system.

15. A laser processing apparatus comprising:
a placement base on which a processing receiving object is placed;
an optical system configured to guide laser light to the processing receiving object placed on the placement base;
a gas supply port via which a gas is supplied to a periphery of an irradiated region of the processing receiving object that is a region irradiated with the laser light;
a gas recovery port via which the gas supplied via the gas supply port is recovered;
a mover configured to move the irradiated region of the processing receiving object;
a controller configured to control, in accordance with a direction in which the irradiated region is moved, a direction of a gas flow of the gas caused to flow from the gas supply port to the gas recovery port, the controller being configured to change the direction of the gas flow in response to a change in the direction in which the mover moves the irradiated region in such a way that the gas flows in a direction opposite the direction in which the irradiated region is moved;
a cover configured to surround a space to which the gas is supplied via the gas supply port; and
a third mover configured to move the cover in such a way that the movement follows the movement of the irradiated region moved by the mover.

16. A laser processing system comprising:
a laser apparatus configured to output laser light;
a transfer system configured to transfer the laser light outputted from the laser apparatus;
a placement base on which a processing receiving object is placed;
an optical system configured to shape the laser light transferred via the transfer system and guide the shaped laser light to the processing receiving object placed on the placement base;
a gas supply port via which a gas is supplied to a periphery of an irradiated region of the processing receiving object that is a region irradiated with the laser light;
a gas recovery port via which the gas supplied via the gas supply port is recovered;
a mover configured to move the irradiated region of the processing receiving object;
a controller configured to control, in accordance with a direction in which the irradiated region is moved, a direction of a gas flow of the gas caused to flow from the gas supply port to the gas recovery port, the controller being configured to change the direction of the gas flow in response to a change in the direction in which the mover moves the irradiated region in such a way that the gas flows in a direction opposite the direction in which the irradiated region is moved;
a cover configured to surround a space to which the gas is supplied via the gas supply port, the gas supply port and the gas recovery port being disposed at the cover; and
a rotator configured to rotate the cover in accordance with the direction in which the irradiated region is moved.

17. A laser processing method comprising:
placing a processing receiving object on a placement base;
outputting laser light from a laser apparatus;
guiding the laser light via an optical system to the processing receiving object placed on the placement base to irradiate the processing receiving object with the laser light;
supplying a gas via a gas supply port to a periphery of an irradiated region of the processing receiving object that is a region irradiated with the laser light and recovering via a gas recovery port the gas supplied via the gas supply port;
moving the irradiated region of the processing receiving object;
controlling, in accordance with a direction in which the irradiated region is moved, a direction of a gas flow of the gas caused to flow from the gas supply port to the gas recovery port, controlling the direction of the gas flow including changing the direction of the gas flow in response to a change in the direction in which the irradiated region is moved in such a way that the gas flows in a direction opposite the direction in which the irradiated region is moved;

surrounding by a cover a space to which the gas is supplied via the gas supply port, the gas supply port and the gas recovery port being disposed at the cover; and rotating by a rotator the cover in accordance with the direction in which the irradiated region is moved.

18. A laser processing system comprising:

a laser apparatus configured to output laser light;

a transfer system configured to transfer the laser light outputted from the laser apparatus;

a placement base on which a processing receiving object is placed;

an optical system configured to shape the laser light transferred via the transfer system and guide the shaped laser light to the processing receiving object placed on the placement base;

a gas supply port via which a gas is supplied to a periphery of an irradiated region of the processing receiving object that is a region irradiated with the laser light;

a gas recovery port via which the gas supplied via the gas supply port is recovered;

a mover configured to move the irradiated region of the processing receiving object;

a controller configured to control, in accordance with a direction in which the irradiated region is moved, a direction of a gas flow of the gas caused to flow from the gas supply port to the gas recovery port, the controller being configured to change the direction of the gas flow in response to a change in the direction in which the mover moves the irradiated region in such a way that the gas flows in a direction opposite the direction in which the irradiated region is moved;

a cover configured to surround a space to which the gas is supplied via the gas supply port; and a third mover configured to move the cover in such a way that the movement follows the movement of the irradiated region moved by the mover.

19. A laser processing method comprising:

placing a processing receiving object on a placement base;

outputting laser light from a laser apparatus;

guiding the laser light via an optical system to the processing receiving object placed on the placement base to irradiate the processing receiving object with the laser light;

supplying a gas via a gas supply port to a periphery of an irradiated region of the processing receiving object that is a region irradiated with the laser light and recovering via a gas recovery port the gas supplied via the gas supply port;

moving the irradiated region of the processing receiving object;

controlling, in accordance with a direction in which the irradiated region is moved, a direction of a gas flow of the gas caused to flow from the gas supply port to the gas recovery port, controlling the direction of the gas flow including changing the direction of the gas flow in response to a change in the direction in which the irradiated region is moved in such a way that the gas flows in a direction opposite the direction in which the irradiated region is moved;

surrounding by a cover a space to which the gas is supplied via the gas supply port; and moving by a third mover the cover in such a way that the movement follows the movement of the irradiated region moved by the mover.

* * * * *